United States Patent
Jahanshahi et al.

(10) Patent No.: US 12,481,256 B2
(45) Date of Patent: Nov. 25, 2025

(54) METHOD AND SYSTEM FOR MODELLING INDUSTRIAL PROCESSES

(71) Applicant: Siemens Energy AS, Oslo (NO)

(72) Inventors: Esmaeil Jahanshahi, Trondheim (NO); Arnstein Rekstad, Trondheim (NO); Vegard Kleppe Torkelsen, Oslo (NO)

(73) Assignee: Siemens Energy AS, Oslo (NO)

( * ) Notice: Subject to any disclaimer, the term of this patent is extended or adjusted under 35 U.S.C. 154(b) by 368 days.

(21) Appl. No.: 18/038,740

(22) PCT Filed: Nov. 30, 2021

(86) PCT No.: PCT/EP2021/083621
§ 371 (c)(1),
(2) Date: May 25, 2023

(87) PCT Pub. No.: WO2022/117582
PCT Pub. Date: Jun. 9, 2022

(65) Prior Publication Data
US 2024/0036532 A1   Feb. 1, 2024

(30) Foreign Application Priority Data
Dec. 1, 2020 (GB) .................................... 2018941

(51) Int. Cl.
*G05B 13/04* (2006.01)
*G05B 13/02* (2006.01)
*G06F 17/13* (2006.01)

(52) U.S. Cl.
CPC ......... *G05B 13/048* (2013.01); *G05B 13/027* (2013.01); *G06F 17/13* (2013.01)

(58) Field of Classification Search
None
See application file for complete search history.

(56) References Cited

U.S. PATENT DOCUMENTS

| 7,630,868 B2 * | 12/2009 | Turner ................. G05B 13/027 706/14 |
| 2005/0187643 A1 * | 8/2005 | Sayyar-Rodsari ... G05B 13/048 700/28 |

FOREIGN PATENT DOCUMENTS

| EP | 3193218 A2 | 7/2017 |
| WO | 2020214075 A1 | 10/2020 |

OTHER PUBLICATIONS

PCT International Search Report and Written Opinion of International Searching Authority mailed Feb. 24, 2022 corresponding to PCT International Application No. PCT/EP2021/083621 filed Nov. 30, 2021.

(Continued)

*Primary Examiner* — Ryan A Jarrett
(74) *Attorney, Agent, or Firm* — Wolter Van Dyke Davis, PLLC

(57) ABSTRACT

A method and system for modelling industrial processes, including closed loop feedback processes. The system includes a sensor for measuring an input for the industrial process; and a processor configured to receive a measurement of the input from the sensor at an input time. The processor is also configured to implement a hybrid neural network model to output a derivative of the output at the input time, wherein the neural network model incorporates at least one neural network block and a first-principle block incorporating dynamic model having an ordinary differential equation defining the rate of change over time of the output as a function of the or each associated input; to input the derivative to an ordinary differential equation solver to predict the output at a subsequent time; and to output the prediction of the output at the subsequent time using the measured input.

15 Claims, 19 Drawing Sheets

(56) References Cited

OTHER PUBLICATIONS

Astrom; Identification of nonlinear systems—a survey; Billings et al; (published in IEE proceedings D—Control Theory and Applications 126(6): 2727-285; 145-146 (1980).
Ljung, Lennart; System Identification: Theory for the User. 1999 published by Upper Saddle River, NJ, PTR Prentice Hall.

* cited by examiner

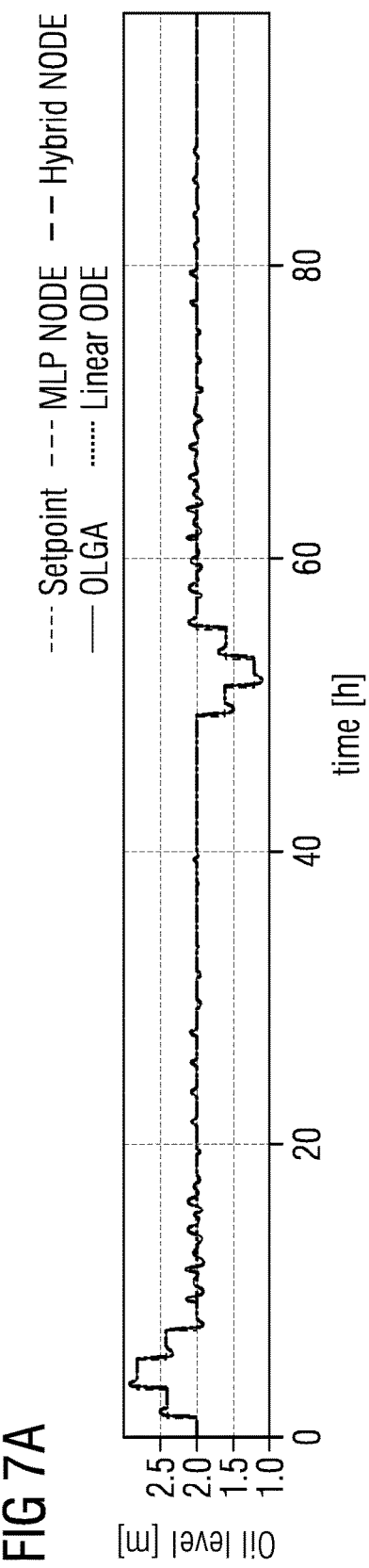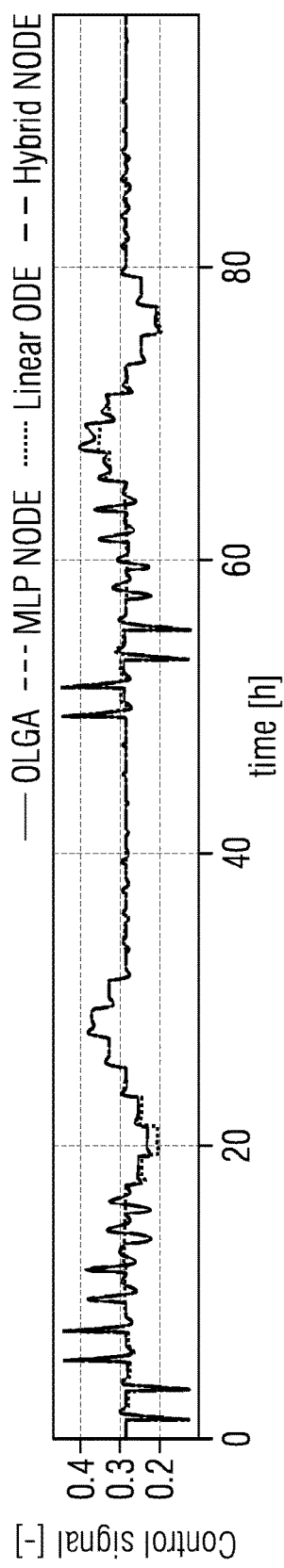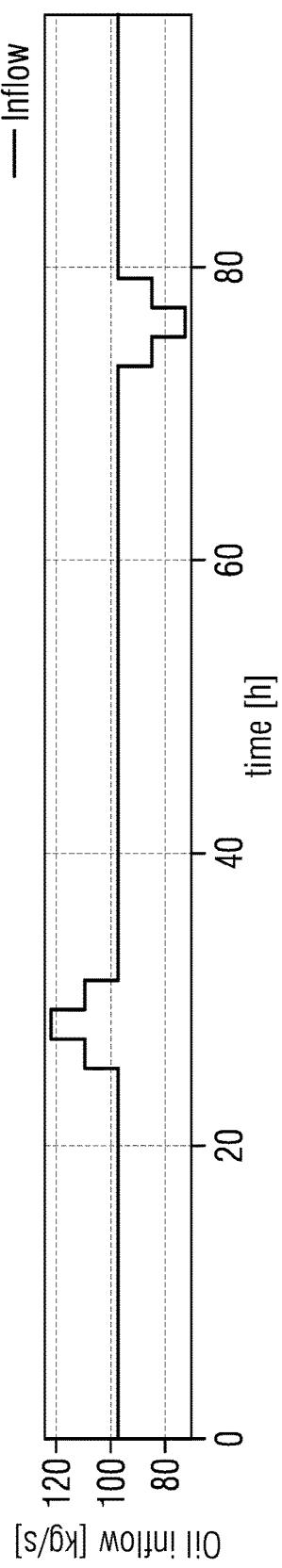

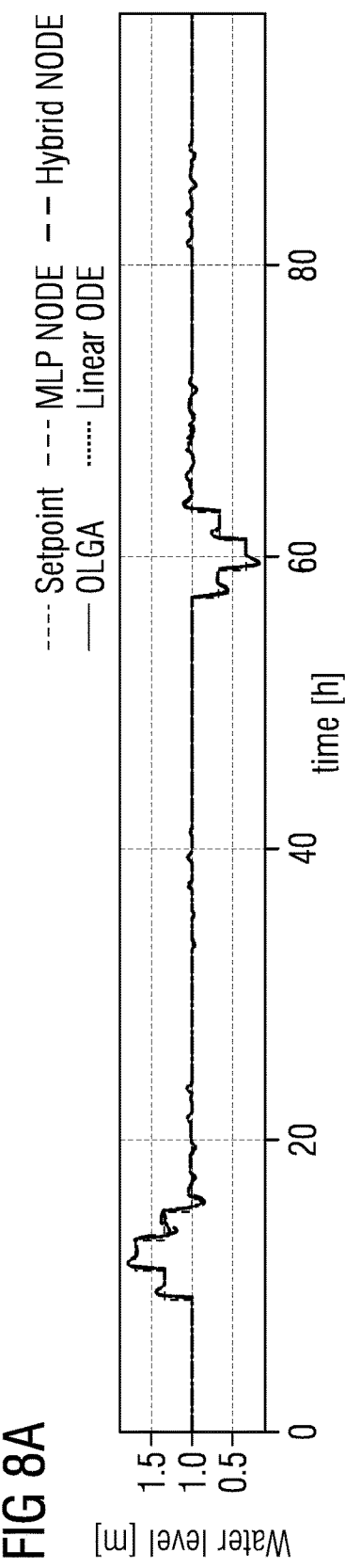
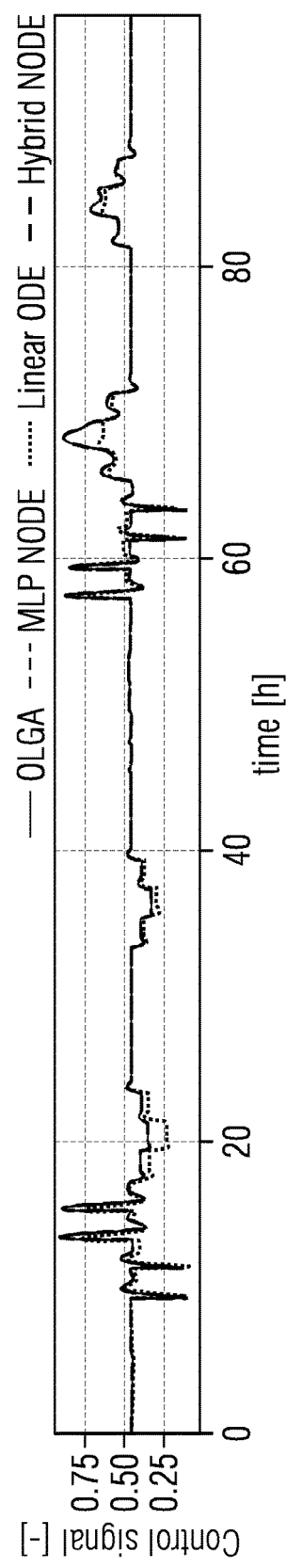
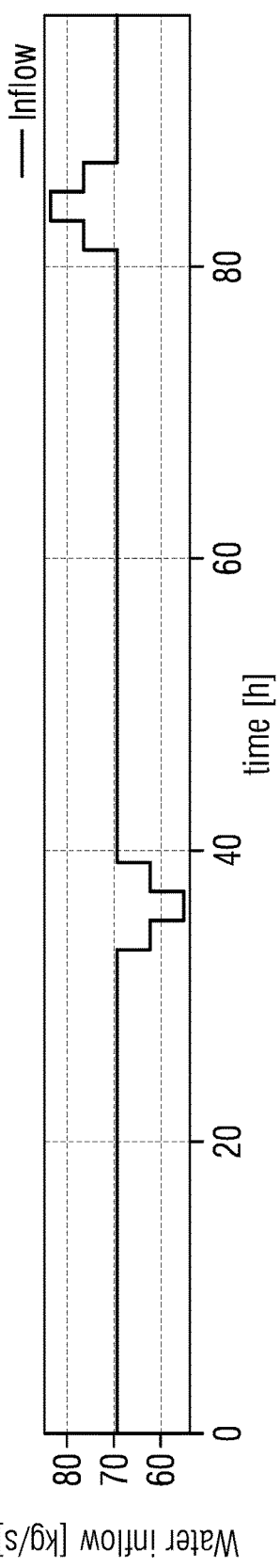

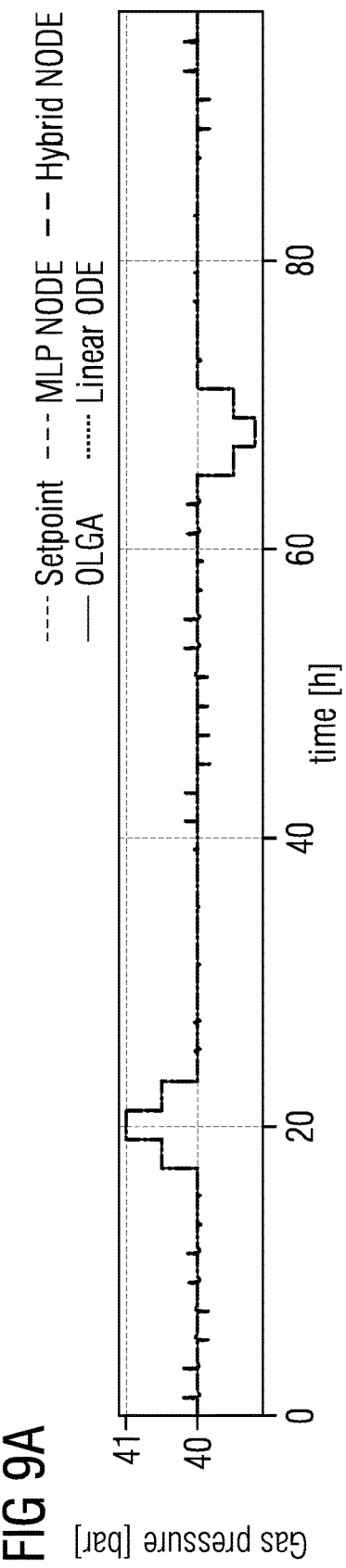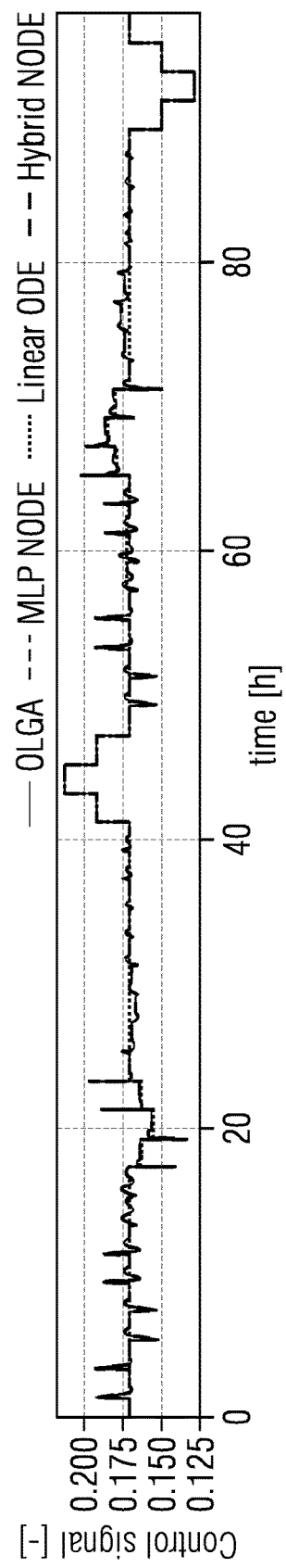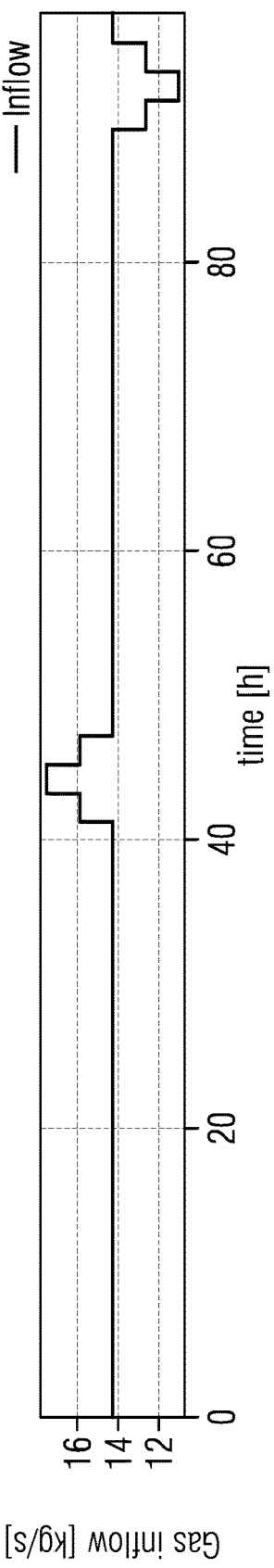

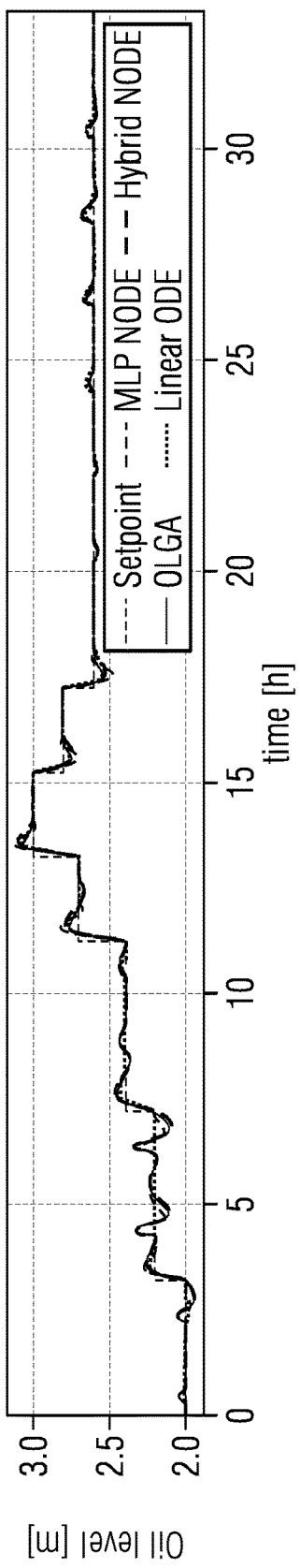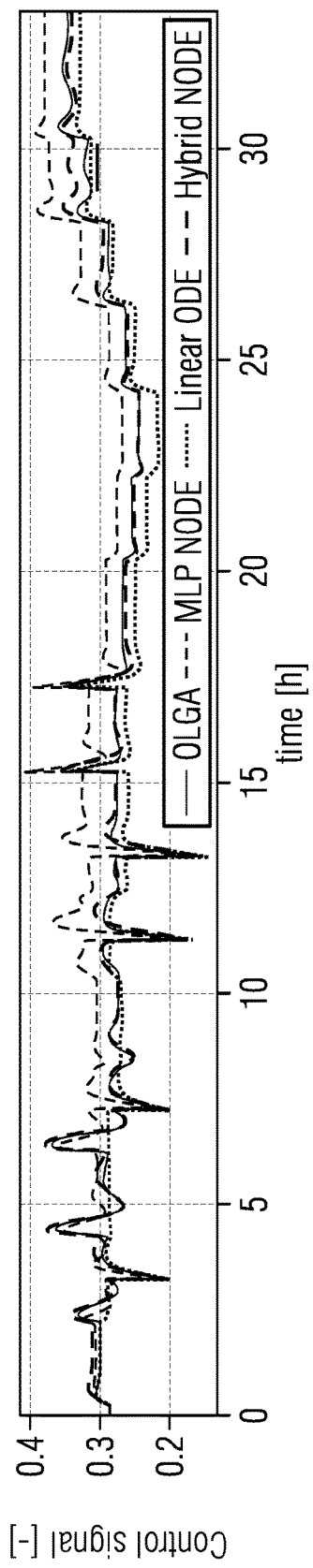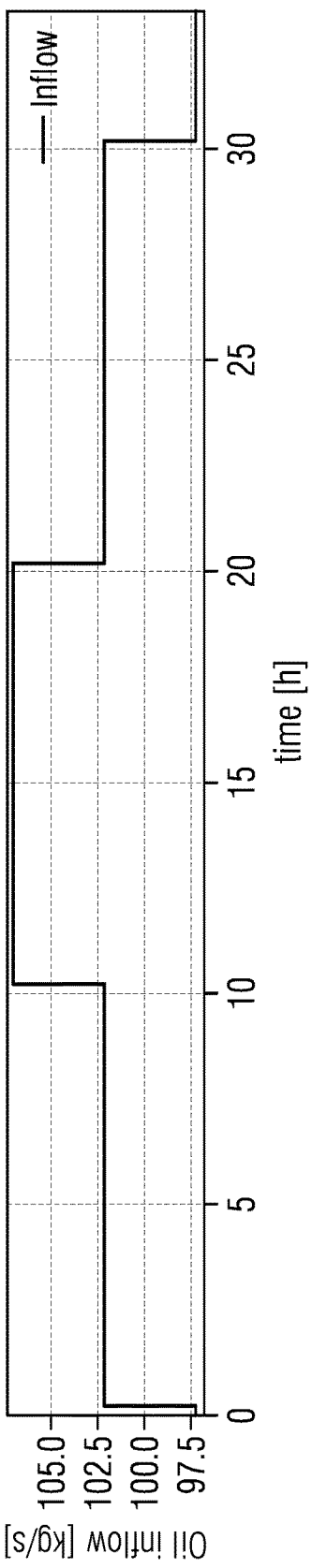

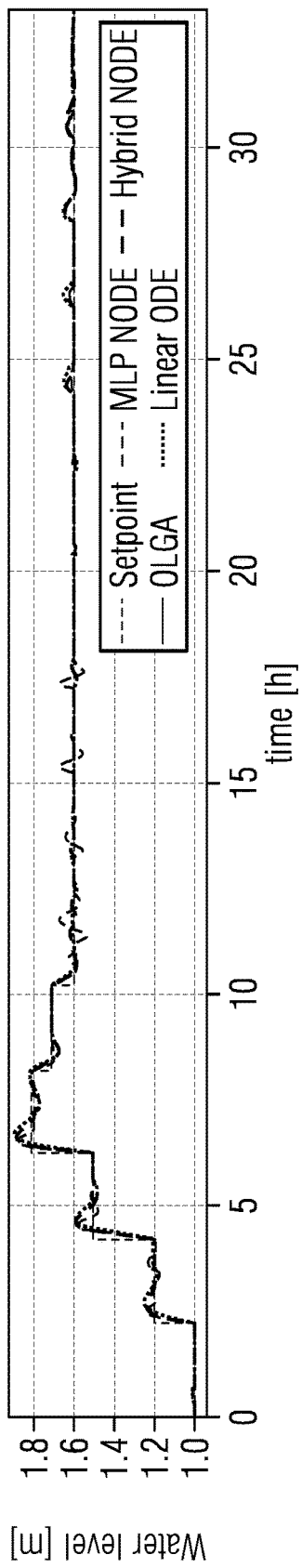
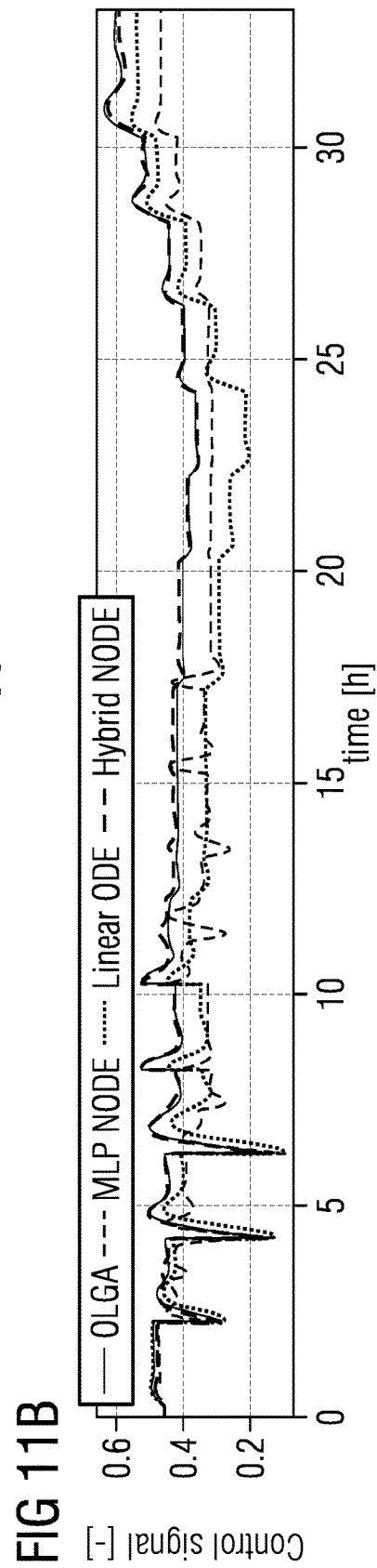
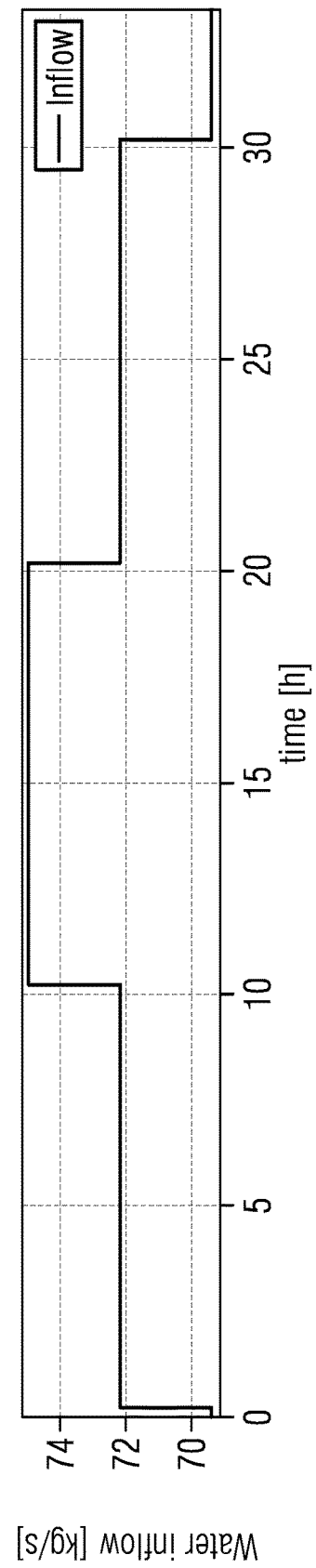

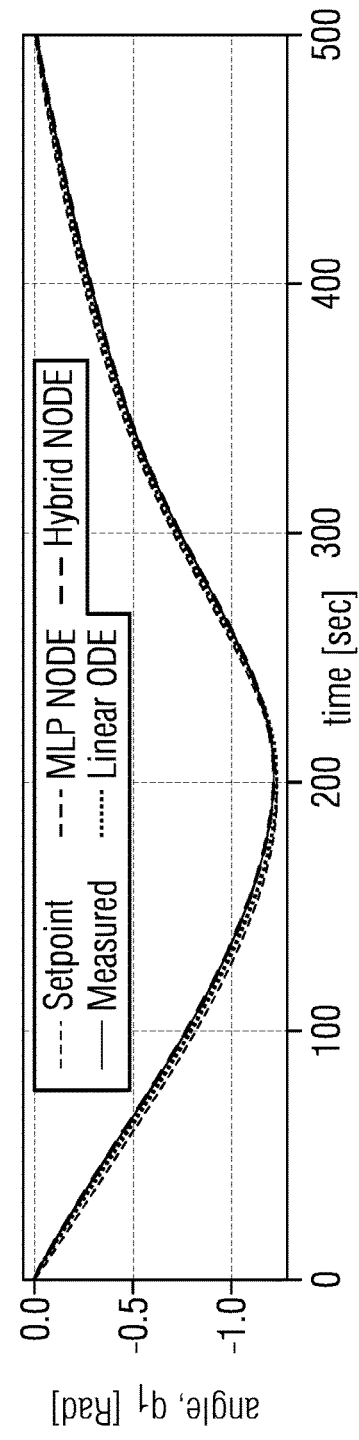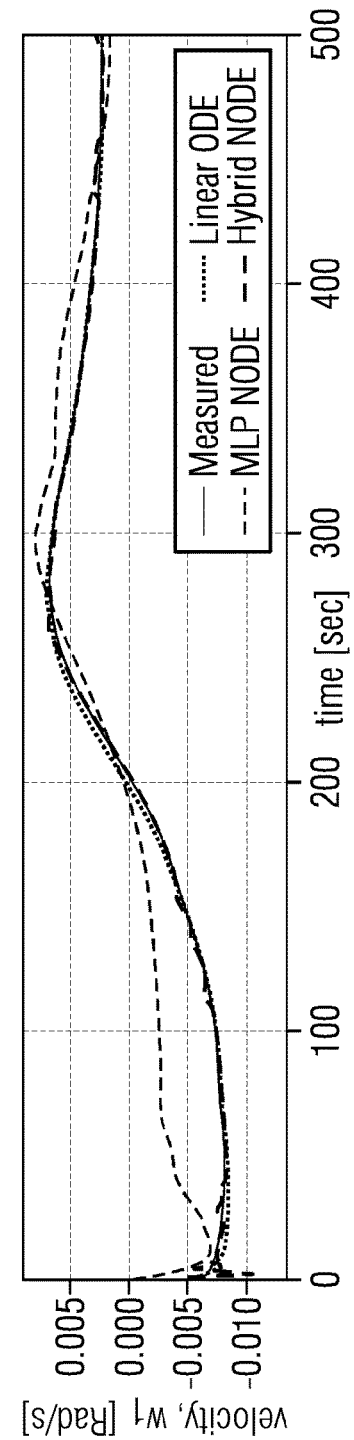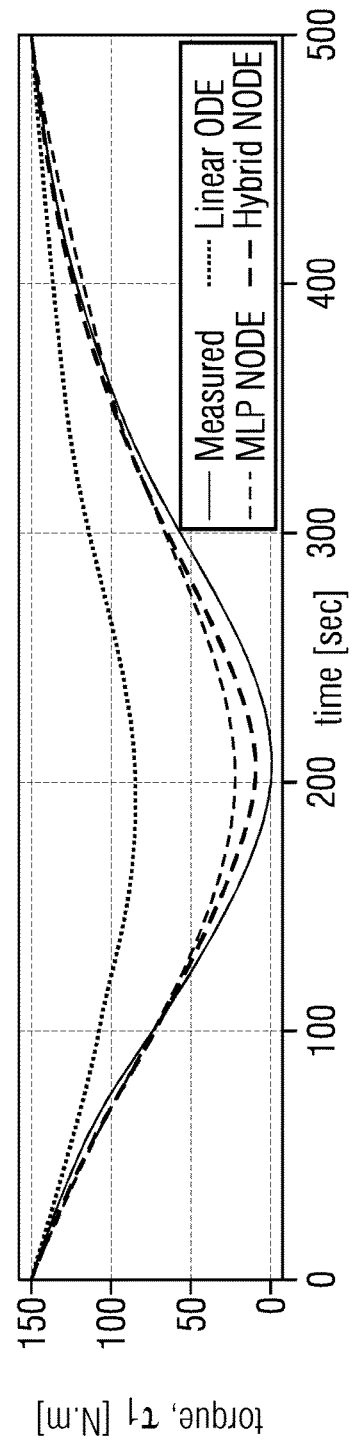

METHOD AND SYSTEM FOR MODELLING INDUSTRIAL PROCESSES

CROSS REFERENCE TO RELATED APPLICATIONS

This application is the US National Stage of International Application No. PCT/EP2021/083621 filed 30 Nov. 2021, and claims the benefit thereof. The International Application claims the benefit of United Kingdom Application No. GB 2018941.1 filed 1 Dec. 2020. All of the applications are incorporated by reference herein in their entirety.

FIELD OF INVENTION

The present invention relates to a method and system for modelling industrial processes, for example by producing dynamic digital twins for industrial processes and/or identifying dynamic models of control loops for PID tuning.

BACKGROUND OF INVENTION

Economic optimization, Advances Process Control (APC), improved process control performance, automatic fault detection, and estimation of unmeasured process variables have numerous benefits and incentives in different processing industries. These methodologies heavily rely on mathematical models of the processing plants (systems) and the ability to update the models. The need for accurate mathematical models has been one of the main challenges, e.g., in Nonlinear Model-Predictive Control (NMPC).

There has been a great interest in data-driven modelling techniques in academia and the industry in the last two decades. The main drivers for data-driven approaches are the emergence of new technologies in sensing instrumentation, improved and secure data acquisition protocols, the ability to store a large volume of data in time-series databases, and advances in machine learning techniques. The data-driven modelling is also referred to as "system identification". The classic system identification methods have been used since the 1970s (for example as described in System Identification: Theory for the User by Ljung 1999 published by Upper Saddle River, NJ, PTR Prentice Hall). They focus on identifying a linear dynamic model for the process and use the linear model for controller design.

As described in "Identification of nonlinear systems—a survey" by Billings et al published in IEE proceedings D—Control Theory and Applications 126(6): 2727-285 1980, real processes typically have a nonlinear nature. The conventional feedforward Deep Neural Networks, also known as Multi-Layer Perceptron (MLP), find a static nonlinear function of the process that is y=f(x). Here f is a static (i.e., memoryless) model and does not include any dynamic information. These static models can only describe steady-state behaviour and cannot represent the transient (i.e., time-dependent) responses. On the other hand, the nonlinear dynamic models can represent both the transient and steady-state behaviour of the process.

There have been recent developments to add dynamics to Deep Neural Networks. LSTM (Long-Short Term Memory) and ResNet (Residual Networks) are the two most well-known examples of such networks. LSTM and ResNet have many drawbacks (such as high memory usage) and are not able to capture the dynamics efficiently because of their structural limitations.

WO2020/214075 describes a method and corresponding systems and computer-programs for evaluating and/or adapting one or more technical models related to an industrial and/or technical process. The method comprises obtaining (S1) a fully or partially acausal modular parameterized model of an industrial and/or technical process comprising at least one physical sub-model and at least one neural network sub-model, including one or more parameters of the parameterized model. The method further comprises generating (S2) a system of differential equations based on the parameterized model, and simulating (S3) the dynamics of one or more states of the industrial and/or technical process over time based on the system of differential equations. The method also comprises applying (S4) reverse-mode automatic differentiation with respect to the system of differential equations when simulating the industrial and/or technical process in order to generate an estimate representing an evaluation of the model of the industrial and/or technical process.

An improved system and method are thus desirable.

SUMMARY OF INVENTION

To address these problems, the present invention provides a computer-implemented method for modelling an industrial process, wherein the industrial process is a closed loop process comprising a controller. The method comprising: measuring, using at least one sensor, at least one input for the industrial process at an input time; and predicting at least one output of the industrial process at a subsequent time using the at least one measured input. Predicting the at least one output comprises using a hybrid neural network model to output a derivative of the at least one output at the input time, wherein the hybrid neural network model incorporates at least one neural network model and a first-principle model incorporating a dynamic model comprising at least one ordinary differential equation defining the rate of change over time of the at least one output as a function of the or each associated input; and inputting the derivative to an ordinary differential equation solver to predict at least one output at the subsequent time. The at least one neural network model comprises a first memoryless nonlinear block which is parametrized by a first vector and a second memoryless nonlinear block which is parametrized by a second vector. The first-principle model is parametrized by a third vector. A coefficient vector comprising the first, second and third vectors parametrizes the hybrid neural network model whereby the hybrid neural network model is fitted to training input and output observations from the industrial process. The hybrid neural network model further incorporates a control block for incorporating parameters of the controller into the hybrid neural network model. Using the hybrid neural network model comprises: receiving, at at least one (or both) of the first and second memoryless nonlinear blocks, a controller output from the control block; receiving, at the first memoryless nonlinear block, the at least one measured input; producing, by the first memoryless nonlinear block, a first intermediate output; receiving, at the second memoryless nonlinear block, an output of the industrial process at the input time; producing, by the second memoryless nonlinear block, a second intermediate output receiving, at the first principle model, the first and second intermediate outputs; and producing, by the first principle model, the derivative of the at least one output at the input time.

According to another aspect of the invention, there is provided a data processing system for modelling an industrial process wherein the industrial process is a closed loop process. The system comprises at least one sensor for measuring at least one input for the industrial process; a controller; and a processor. The processor is configured to receive a measurement of the at least one input from the at least one sensor at an input time; implement a hybrid neural network model to output a derivative of the at least one output at the input time based on the received measurement, wherein the hybrid neural network model incorporates at least one neural network model and a first-principle model incorporating a dynamic model comprising an ordinary differential equation defining the rate of change over time of the at least one output as a function of the or each associated input; input the derivative to an ordinary differential equation solver to predict the at least one output at a subsequent time; and output the prediction of at least one output at the subsequent time using the at least one measured input. The at least one neural network model comprises a first memoryless nonlinear block which is parametrized by a first vector and a second memoryless nonlinear block which is parametrized by a second vector. The first-principle model is parametrized by a third vector. A coefficient vector comprising the first, second and third vectors parametrizes the hybrid neural network model whereby the hybrid neural network model is fitted to training input and output observations from the industrial process. The hybrid neural network model further incorporates a control block for incorporating parameters of the controller into the hybrid neural network model. Using the hybrid neural network model comprises: receiving, at at least one (or both) of the first and second memoryless nonlinear blocks, a controller output from the control block; receiving, at the first memoryless nonlinear block, the at least one measured input; producing, by the first memoryless nonlinear block, a first intermediate output; receiving, at the second memoryless nonlinear block, an output of the industrial process at the input time; producing, by the second memoryless nonlinear block, a second intermediate output, receiving, at the first principle model, the first and second intermediate outputs; and producing, by the first principle model, the derivative of the at least one output at the input time.

We also describe a computer-implemented method for modelling an industrial process, the method comprising: measuring, using at least one sensor, at least one input for the industrial process at an input time; and predicting at least one output of the industrial process at a subsequent time using the at least one measured input; wherein predicting the at least one output comprises using a hybrid neural network model to output a derivative of the at least one output at the input time, wherein the hybrid neural network model incorporates at least one neural network block and a first-principle block using a dynamic model comprising at least one ordinary differential equation defining the rate of change over time of the at least one output as a function of the or each associated input; and inputting the derivative to an ordinary differential equation solver to predict at least one output at the subsequent time.

We also describe a data processing system for modelling an industrial process. The data processing system for modelling an industrial process may comprise at least one sensor for measuring at least one input for the industrial process; and a processor which is configured to receive a measurement of the at least one input from the at least one sensor at an input time; implement a neural network model to output a derivative of the at least one output at the input time based on the received measurement, wherein the neural network model incorporates at least one neural network block and a first-principle block incorporating a dynamic model comprising an ordinary differential equation defining the rate of change over time of the at least one output as a function of the or each associated input; input the derivative to an ordinary differential equation solver to predict the at least one output at a subsequent time; and output the prediction of the at least one output at the subsequent time using the at least one measured input.

The following features apply to both the computer-implemented method and the data processing system described above.

The measuring and predicting steps may be repeated for multiple iterations. In an initial iteration, the measuring step may include measuring an initial value of the at least one output at the initial step (i.e. time t=0). The predicting step may include using the at least one measured input and the measured initial value of the at least one output to predict the at least one output of the industrial process at a subsequent time. In subsequent iterations, the predicting step may use the at least one measured input and the predicted value of the at least one output which was predicted in a previous iteration. Alternatively, in subsequent iterations, the predicting step may use the at least one measured input and a measured value of the at least one output. In other words, the output of the industrial process which is input to the second memoryless nonlinear block may be selected from a measured output and a predicted output. Similarly, the output of the industrial process which is input to the control block may be selected from a measured output and a predicted output.

The dynamic model may be a linear or non-linear model. The first principle model may be termed a first principle block may (and the terms may be used interchangeably). Similarly, the at least one neural network model may be termed a neural network block (and the terms may be used interchangeably). The first principle model receives an input from the at least one neural network model.

The at least one neural network model may comprise a first memoryless nonlinear block parametrized by a first vector and a second memoryless nonlinear block parametrized by a second vector. The first memoryless nonlinear block may receive the at least one measured input and may thus be termed an input neural block (and the terms may be used interchangeably). The first memoryless nonlinear block may output a first intermediate output. The second memoryless nonlinear block may receive the at least one output and may thus be termed an output block (and the terms may be used interchangeably). The second memoryless nonlinear may output a second intermediate output. In the initial iteration, the output neural block may receive an initial value of the least one output. In subsequent iterations, the output neural block may receive a value of the at least one output which was predicted in the previous iteration. In other words, the input neural block may implement a first memoryless nonlinear block parametrized by a first vector and the output neural block may implement a second memoryless nonlinear block parametrized by a second vector. Both the first and second intermediate outputs may be input to the first principle block. The hybrid neural network model may be expressed $$w_t = f_H(., \alpha)$$

$$z_t = f_w^{-1}(., \beta)$$

$$\frac{dy_t}{dt} = g(., \gamma)$$

$$\theta = [\alpha, \beta, \gamma]$$

where $w_t$ is the intermediate output from the first nonlinear block, $z_t$ is the intermediate output from the second nonlinear block, $y_t$ is the output of the industrial process at the input time t, $f_H(.,\alpha)$ and $f_W^{-1}(.,\beta)$ are memoryless nonlinear blocks parametrized by the vectors $\alpha$ and $\beta$, respectively, $g(.,\gamma)$ is the dynamic first-principle block which is parametrized by the vector $\gamma$, and $\theta$ is the coefficient vector that parametrizes the model to fit the input and output observations from the industrial process. The input and output observations ($U_N$ and $Y_N$) are the measurements which are used to train the hybrid neural network model and may be termed a set of training observations.

The nonlinear block $f_H$ block may be considered similar to the first nonlinear block from the Hammerstein-Wiener model structure (which may also be termed the Hammerstein nonlinear block) and $f_W^{-1}$ may be considered to be the inverse of the $f_W$ or second nonlinear block from the Hammerstein-Wiener model structure (which may also be termed the Wiener nonlinear block). The combined Hammerstein-Wiener model thus comprises a dynamic linear element $g(.,\gamma)$ sandwiched between two static nonlinear elements $f_H$ and $f_W$. In the arrangement described above, both the nonlinear blocks occur before the dynamic block $g(.,\gamma)$ and thus the nonlinear block from the Wiener model $f_W(.,\beta)$ may be considered to inverted relative to the order in the Hammerstein-Wiener model and is thus represented in the expressions above as $f_W^{-1}(.,\beta)$.

The industrial process is a closed loop process comprising at least one controller, for example a PID (proportional-integral-derivative) controller. The hybrid neural network model further incorporates a control block (which may be another nonlinear neural network block). Alternatively, the controller parameters may be known and incorporated in the hybrid neural network model. In the closed loop process, measuring at least one input may comprise measuring at least one of a setpoint and a disturbance. A setpoint may be defined as the desired value of the measurement and may alternatively termed a reference value. The controller may regulate the measurement on the setpoint by changing the input. The disturbance may be defined as any independent (i.e. not controlled) variable that affects the process operation. The effect of the disturbances may be undesirable and may be counteracted by control (regulation). The disturbance may be measurable or unmeasured. The hybrid neural network model for a closed loop process may be defined as:

$$u_t = c(y_t, r_t)$$

$$w_t = f_H(y_t, u_t, d_t, \alpha)$$

$$z_t = f_w^{-1}(y_t, u_t, \beta)$$

$$\frac{dy_t}{dt} = g(z_t, w_t, \gamma)$$

$$\theta = [\alpha, \beta, \gamma]$$

where $w_t$ is the first intermediate output, $z_t$ is the second intermediate output, $u_t$ is a controller output from the control block, $y_t$ is an output of the industrial process at the input time, $d_t$ is the input disturbance and the at least one measured input, $r_t$ is the input setpoint and the at least one measured input. $c(.)$ is the controller block with fixed known parameters, $f_H(.,\alpha)$ and $f_W^-(.,\beta)$ are the first and second memoryless nonlinear blocks parametrized by the the first and second vectors $\alpha$ and $\beta$, respectively, $g(.,\gamma)$ is the first-principle model which is parametrized by the third vector $\gamma$, and $\theta$ is the coefficient vector that parametrizes the hybrid neural network model to fit the training data (i.e. at least one predicted output to at least one measurement from the actual process).

The dynamic model in the first-principle block may be a first order or a second order dynamic model defined by at least one ordinary differential equation. For example, for a first order dynamic model, the model may be of the form:

$$\tau \frac{dz_t}{dt} = K_p w_t(t - \theta_p) - z_t$$

where $w_t$ is the input to the model, $z_t$ is the output from the model, $K_p$ is the steady-state gain, $\tau$ is the time constraint, and $\theta_p$ is the time delay. The dynamic model may thus include steady-state process gains and time constants. Where there are multiple outputs from the industrial process, additional terms may be added to represent interaction between outputs from the industrial process.

The hybrid neural network model may be trained before predicting the at least one output. The system may further comprise a memory for storing training data for training the hybrid neural network model. The storage may be any suitable memory, e.g. non-volatile or volatile memory. The storage may be local to the processor, e.g. located within the same system, or may be remote from the processor, e.g. at a different location such as the cloud.

The hybrid neural network model outputs a derivative of the at least one output at the input time and the derivative is input to an ordinary differential equation solver to predict at least one output. The underlying ODE of the dynamic model may be considered to be directly encoded in the hybrid neural network model during training. After training, the hybrid neural network model may take any point y(t) as input to predict the next point y(t+Δt) after time Δt by taking steps in the ODE solver, based on the information about the derivative encoded in the neural network model. The prediction may be done by outputting a derivative $dy/dt(t_j)$ at the input point $y(t_j)$ and inputting this derivative to the ODE solver so that the final output is $y(t_{j+1})$. In other words, a previous prediction for y(t) at an input time can be used to predict the next time point y(t+Δt). The initial condition of y(t) at t=0 may be measured or otherwise input. The output of the industrial process which is input to the second memoryless nonlinear block and/or the control block may be selected from a measured output and a predicted output.

The ODE solver may have an adaptive step size, whereby it is possible to handle time-series data with irregular time stamps. For example, the adaptive time step may be tj and the output from the neural network model may be expressed as:

$$\frac{dy}{dt}(t_j) = F(y(t_j), t_j)$$

As an example, the industrial process may be a gravity separation process for separating oil, water and gas. Measuring the at least one output may comprise measuring the outputs: oil level, water level and gas pressure. The dynamic model may comprise six inputs including three disturbances (oil inflow, water inflow and gas inflow) and three setpoints (setpoints for oil level, water level and gas pressure). The dynamic model may include steady-state process gains and time constants together with the effects of the disturbances and additional terms to represent interaction between the different outputs. For example, the dynamic model may be defined by the following ordinary differential equations:

$$\frac{dy_{oil}}{dt} = \frac{(K_{po}u_{oil} - y_{oil}) + K_{do}d_{oil} + K_{wo}y_{wat} + K_{go}y_{gas}}{\tau_{oil}}$$

$$\frac{dy_{wat}}{dt} = \frac{(K_{pw}u_{wat} - y_{wat}) + K_{dw}d_{wat} + K_{ow}y_{oil} + K_{gw}y_{gas}}{\tau_{wat}}$$

$$\frac{dy_{gas}}{dt} = \frac{(K_{pg}u_{gas} - y_{gas}) + K_{dg}d_{gas} + K_{og}y_{oil} + K_{wg}y_{wat}}{\tau_{gas}}$$

where $K_{po}$, $K_{pg}$ and $K_{pw}$ are the steady-state process gains with respect to the control inputs $u_{oil}$, $u_{gas}$ and $u_{water}$, $\tau_{oil}$, $\tau_{gas}$ and $\tau_{water}$ are the time constants, $K_{do}$, $K_{dg}$ and $K_{dw}$ represent the effect of the input disturbances $d_{oil}$, $d_{gas}$ and $d_{water}$, $K_{wo}$ and $K_{go}$ represent the effects of the gas and water outputs $y_{gas}$ and $y_{water}$ when modelling the derivative for the oil output $y_{oil}$, $K_{ow}$ and $K_{gw}$ represent the effects of the oil and gas outputs $y_{oil}$ and $y_{gas}$ when modelling the derivative for the water output $y_{water}$ and $K_{og}$ and $K_{wg}$ represent the effects of the oil and water outputs $y_{oil}$ and $y_{wat}$ when modelling the derivative for the gas output $y_{gas}$ As another example, the industrial process may be controlling a robotic arm having two connected links. Measuring the at least one output may comprise measuring the angles of the two links and/or the velocities of the two links. The angle of the first link may be measured as the angle between a long axis of the first link and a reference line (e.g. a line parallel to a work surface on which the arm is situated). The angle of the second link may be measured as the angle between a long axis of the second link and the long axis of the first link. The dynamic model of the first-principle block may comprise two inputs: two torques, one for each of the links. The dynamic model may include steady-state process gains and time constants together with additional terms to represent interaction between the different outputs. For example, the dynamic model may be defined by the following ordinary differential equations:

$$\dot{q}_1 = w_1$$

$$\dot{w}_1 = \frac{1}{\tau_{s1}}\left(\frac{k_{p1}}{\tau_{s1}}u_1 - 2\xi_1 w_1 - \frac{q_1}{\tau_{s1}} - c_{12}w_2 - \frac{k_{12}q_2}{\tau_{s1}}\right)$$

$$\dot{q}_2 = w_2$$

$$\dot{w}_2 = \frac{1}{\tau_{s2}}\left(\frac{k_{p2}}{\tau_{s2}}u_2 - 2\xi_2 w_2 - \frac{q_2}{\tau_{s2}} - c_{21}w_2 - \frac{k_{21}q_1}{\tau_{s2}}\right)$$

where $q_1$ and $q_2$ are the angles of the first and second links respectively, $w_1$ and $w_2$ are the velocities of the first and second links respectively. $k_{p1}$ and $k_{p1}$ are the steady state process gains with respect to the control inputs (torque). $\tau_{s1}$ and $\tau_{s2}$ are the second order time constants and $\xi_1$ and $\xi_2$ are the damping factors. There are additional terms to account for the interactions between the two links, namely $c_{12}$, $c_{21}$, $k_{12}$, $k_{21}$.

According to another aspect of the invention, there is provided a (non-transitory) computer readable medium carrying processor control code which when implemented in a system causes the system to carry out the method described above.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise." as well as derivatives thereof, mean inclusion without limitation; the term "or" is inclusive, meaning and/or; the phrases associated with" and "associated therewith," as well as derivatives thereof: may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

The above-mentioned attributes and other features and advantages of this invention and the manner of attaining them will become more apparent and the invention itself will be better understood by reference to the following description of embodiments of the invention taken in conjunction with the accompanying drawings, wherein like numbers designate like objects, and in which

FIGS. 7a, 7b and 7c are graphs plotting the variation in oil level (m), control signal and oil inflow (kg/s) with time for the training data for the oil level controller in FIG. 5 or 6;

FIGS. 8a, 8b and 8c are graphs plotting the variation in water level (m), control signal and water inflow (kg/s) with time for the training data for the water level controller in FIG. 5 or 6;

FIGS. 9a, 9b and 9c are graphs plotting the variation in gas pressure (bar), control signal and gas inflow (kg/s) with time for the training data for the gas level controller in FIG. 5 or 6;

FIGS. 10a, 10b and 10c are graphs plotting the variation in oil level (m), control signal and oil inflow (kg/s) with time for the validation data for the oil level controller in FIG. 5 or 6;

FIGS. 11a, 11b and 11c are graphs plotting the variation in water level (m), control signal and water inflow (kg/s) with time for the validation data for the water level controller in FIG. 5 or 6;

FIGS. 18a, 18b and 18c are graphs plotting the variation in angle (rad), velocity (Rad/s) and torque (N·m) with time for the validation data for the control of a first link in the robotic arm in FIG. 14 or 15

DETAILED DESCRIPTION OF INVENTION

FIGS. 1 through 19c, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Figure 1:
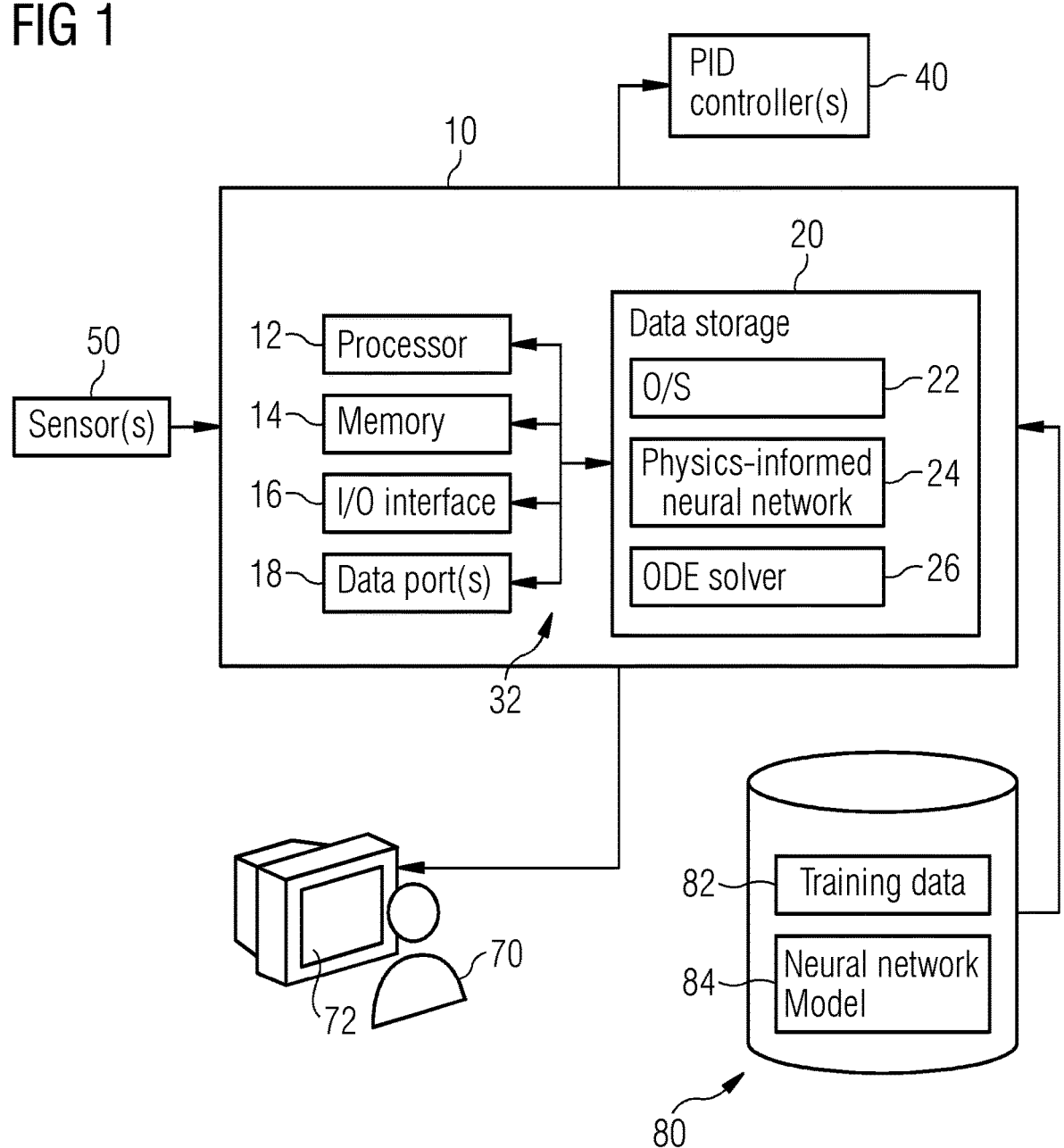
FIG. 1 shows a schematic block diagram of a system in which an embodiment can be implemented.

FIG. 1 is a schematic block diagram illustrating the components of a system implementing an industrial process. The system comprises a computing device 10 which may perform the methods described below. One or more sensors 50 capture one or more measurements which are sent to the computing device 10 for use in the method as described below. The outputs may be input to a controller such as a PID (proportional-integral-derivative) controller 40 or to a user 70 via any suitable user interface 72, e.g. a screen on a computer or other electronic device. PID controllers are typically used in industrial processes having a control loop feedback mechanism. The computing device 10 may also be connected to a database 80, which stores for example the training data 82 and the hybrid neural network model(s) 84 which define the industrial processes and which are implemented on the neural network engine. As explained below, the hybrid neural network model combines a model of the physics of each industrial process (e.g. one or more ordinary differential equations) into an adaptation of the Hammerstein-Wiener model.

The computing device 10 may be formed from one or more servers and the steps (or tasks) in the method described below may be split across the one or more servers or the cloud. The computing device 10 may include one or more processors 12, one or more memory devices (generically referred to herein as memory 14), one or more input/output ("I/O") interface(s) 16, one or more data ports 18, and data storage 20. The computing device 10 may further include one or more buses 32 that functionally couple various components of the computing device 10.

The data storage 20 may store one or more operating systems (O/S) 22; and one or more program modules, applications, engines, computer-executable code, scripts, or the like such as, for example, a neural network engine incorporating a physical model as described below to form a physics-informed neural network 24 and an ordinary differential equation (ODE) solver 26. The neural network 24 together with the ODE solver may be considered to be a neural ODE formulation.

Any of the components depicted as being stored in data storage 20 may include any combination of software, firmware, and/or hardware. The software and/or firmware may include computer-executable code, instructions, or the like that may be loaded into the memory 14 for execution by one or more of the processor(s) 12 to perform any of the operations described below in connection with correspondingly named engines. For example, the processor(s) 12 may be configured to execute computer-executable instructions of the various program modules, applications, engines, or the like of the system to cause or facilitate various operations described below.

The processor(s) 12 may include any suitable processing unit capable of accepting data as input, processing the input data in accordance with stored computer-executable instructions, and generating output data. The processor(s) 12 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 12 may have any suitable microarchitecture design that includes any number of constituent components such as, for example, registers, multiplexers, arithmetic logic units, cache controllers for controlling read/write operations to cache memory, branch predictors, or the like.

Referring to other illustrative components of the computing device, the memory 14 of the computing device 10 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In various implementations, the memory 14 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 14 may include main memory as well as various forms of cache memory.

The input/output (I/O) interface(s) 16 may facilitate the receipt of input information by the computing device 10 from one or more I/O devices (e.g. the sensor(s)) as well as the output of information from the computing device 10 to the one or more I/O devices (e.g. the PID controller(s)). The one or more data ports 18 via which the computing device 10 may communicate with any of the processing modules or the database 80. The bus(es) 32 may include at least one of a system bus, a memory bus, an address bus, or a message bus, and may permit exchange of information (e.g., data (including computer-executable code), signalling, etc.) between various components of the computing device 10. The bus(es) 32 may be associated with any suitable bus architecture.

The O/S 22 may include a set of computer-executable instructions for managing hardware resources of the system and for providing common services to other application programs (e.g., managing memory allocation among various application programs). In certain example embodiments, the O/S 22 may control execution of one or more of the program modules depicted as being stored in the data storage 20. The data storage 20 and/or the database 80 may include removable storage and/or non-removable storage. The data storage 20 may store computer-executable code, instructions, or the like that may be loadable into the memory 14 and executable by the processor(s) 12 to cause the processor(s) 12 to perform or initiate various operations. The data storage 20 may additionally store data that may be copied to memory 14 for use by the processor(s) 12 during the execution of the computer-executable instructions. Moreover, output data generated as a result of execution of the computer-executable instructions by the processor(s) 12 may be stored initially in memory 14, and may ultimately be copied to data storage 20 or database 80.

Those of ordinary skill in the art will appreciate that the hardware depicted in FIG. 1 may vary for particular implementations. The depicted example is provided for the purpose of explanation only and is not meant to imply architectural limitations with respect to the present disclosure.

Figure 2:
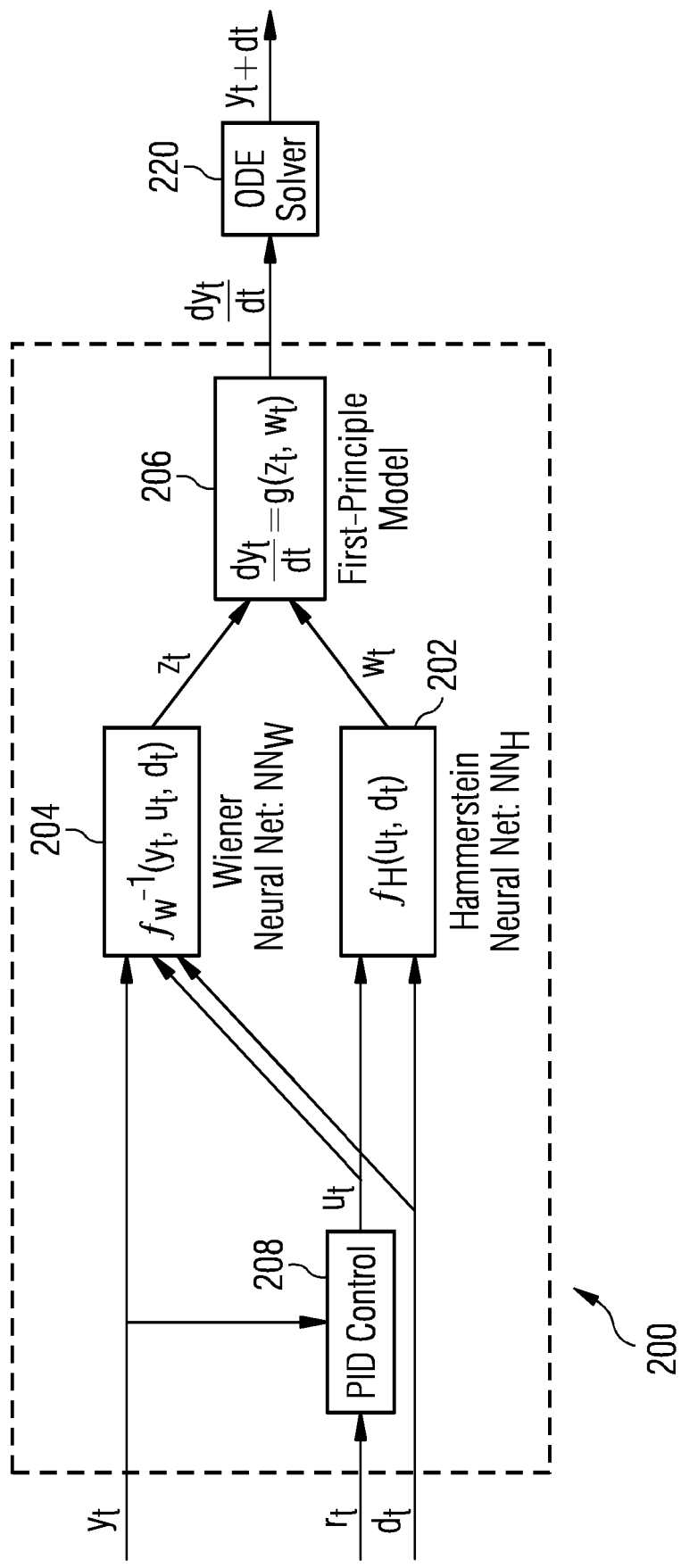
FIG. 2 shows a schematic block diagram of elements of the system of FIG. 1.

FIG. 2 is a more detailed block drawing of one variant of a new hybrid artificial neural network (ANN) approach which may be used to model an industrial process. The ANN comprises a hybrid neural network model 200 implemented on a plurality of neural network models, a first-principle model 206 and an ordinary differential equation (ODE) solver block 220. The new ANN may be termed a hybrid NODE (neural ordinary differential equation) approach because it comprises a plurality of neural models and a first principle model. Specifically, the neural ODE network is used to identify a Hammerstein-Wiener model. The ODE solver block may be any suitable block, including for example a block which uses Euler methods or Runge-Kutta methods. The skilled person will appreciate that the terms "model" and "block" may be used interchangeably. Therefore, "the plurality of neural network models" may be termed "the plurality of neural network blocks", "and the "first-principle model" may be termed "first principle block" etc.

The hybrid neural network model blocks include a first nonlinear block 202, a second nonlinear block 204 and a first principle model 206. In this arrangement, the industrial process being modelled is being operated in closed loop conditions with at least one PID (proportional integral derivative) controller or similar controller. Accordingly, the data driven model must account for the controllers in the industrial process. The hybrid neural network model blocks thus include a PID control block 208. In this example, the controller parameters may be known and incorporated in the hybrid neural network model by use of the PID control block 208.

The model identification may generally be defined as the problem of using N-point data measurements of inputs $U_N=\{u_1, u_2, \ldots u_n\}$ and outputs $Y_N=\{y_1, y_2, \ldots y_n\}$ to estimate a coefficient vector $\theta$ that parametrizes the hybrid neural network model to fit the $U_N$ and $Y_N$ observations (i.e. to fit the set of training observations). Once the hybrid neural network model has been trained to fit the observations, the hybrid neural network model may then be used to predict future behaviour of the industrial process and in particular the output u from the controller.

In this arrangement, the controller sets the inputs $u_t$ and thus as illustrated, the inputs to the system which may be measured are the setpoints $r_t$ and disturbances $d_t$ together with the measurements of the output at the input time $y_t$. As shown, the PID control block 208 receives the inputs, $r_t$ and $y_t$. A PID controller is a well-known type of controller which is defined by the following equations:

$$e(t) = r(t) - y(t)$$

$$u(t) = K_p e(t) + K_i \int_0^t e(t')dt' + K_d \frac{de(t)}{dt}$$

The output $u_t$ from the PID control block 208 is input to both the first nonlinear block 202 and the second nonlinear block 204. The first nonlinear block 202 also receives $d_t$ as input and thus may be termed an input neural block because it receives the measured input. The second nonlinear block 204 receives $y_t$ and $d_t$ as inputs and thus may be termed an output neural block because it receives the output at the input time. Thus, the term the first and second nonlinear blocks and input and output neural blocks may be used interchangeably.

The first nonlinear block 202 and second nonlinear block 204 are nonlinear blocks which may be modelled by feedforward dense neural networks. Feedforward neural networks are the simplest form of networks where connections between the nodes do not form a cycle (for example as described in "Deep learning in neural networks: An overview" by Schmidhuber published in Neural Networks 61: 85-117, 2015). This class of neural networks is also referred to as a 'vanilla' neural network. Also, the first nonlinear block and the second nonlinear block may be modelled using other types of Neural Networks such as LSTM and Convolutional Networks. The outputs from the first nonlinear block 202 and the second nonlinear block 204 are $w_t$ and $z_t$ respectively. These outputs (which may also be termed intermediate outputs of the neural network) are input into to the first principle model 206 which may represent a linear or non-linear model which is defined by at least one ordinary differential equation (ODE). The overall model structure (may be defined as follows:

$u_t = c(y_t, r_t)$ (within the control block)

$w_t = f_H(u_t, d_t, \alpha)$ (within the first nonlinear block)

$z_t = f_w^{-1}(y_t, u_t, d_t, \beta)$ (within the second nonlinear block)

-continued $$\frac{dy_t}{dt} = g(z_t, w_t, \gamma) \text{ (within the first principle model)}$$

$$\theta = [\alpha, \beta, \gamma]$$

where $w_t$ is the first intermediate output, $z_t$ is the second intermediate output, $u_t$ is the output from the controller, $y_t$ is the output, $r_t$ is the input setpoint and $d_t$ is the input disturbance and the at least one measured input, c(.) is the control block with fixed known parameters, $f_H(.,\alpha)$ and $f_W^{-1}(.,\beta)$ are memoryless non linear blocks parametrized by the vectors $\alpha$ and $\beta$, respectively, $g(.,\gamma)$ is the first-principle model which is parametrized by the vector $\gamma$ and derived as explained below, and $\theta$ is the coefficient vector that parametrizes the model to fit the $U_N$ and $Y_N$ observations. The first nonlinear block $f_H$ block may be considered similar to the nonlinear block from the Hammerstein-Wiener model structure and may be termed a Hammerstein Neural Network $NN_H$. The second nonlinear block $f_W^{-1}$ may be considered to be the inverse of the $f_W$ block from the Hammerstein-Wiener model structure may be termed a Wiener Neural Network $NN_W$.

The neural network model outputs the derivative of the output at the input time $$\frac{dy_t}{dt}$$

to the ODE solver 220. As explained with reference to FIG. 4b, the ODE solver 220 takes the steps from an input $y_j$ at time $t_j$ to an output $y_{j+1}$ at time $t_{j+1}$, with the derivative at each point fed to the ODE solver 220. The ANN block having the first nonlinear block, second nonlinear block and the first principle model learns the local derivative $$\frac{dy}{dt}(t_j)$$

at the input $y(t_j)$ which is necessary for the ODE solver 220 to step to the output $y(t_{j+1})$. This allows the hybrid NODE approach shown in FIG. 2 to be used for modelling dynamical systems.

Figure 3:
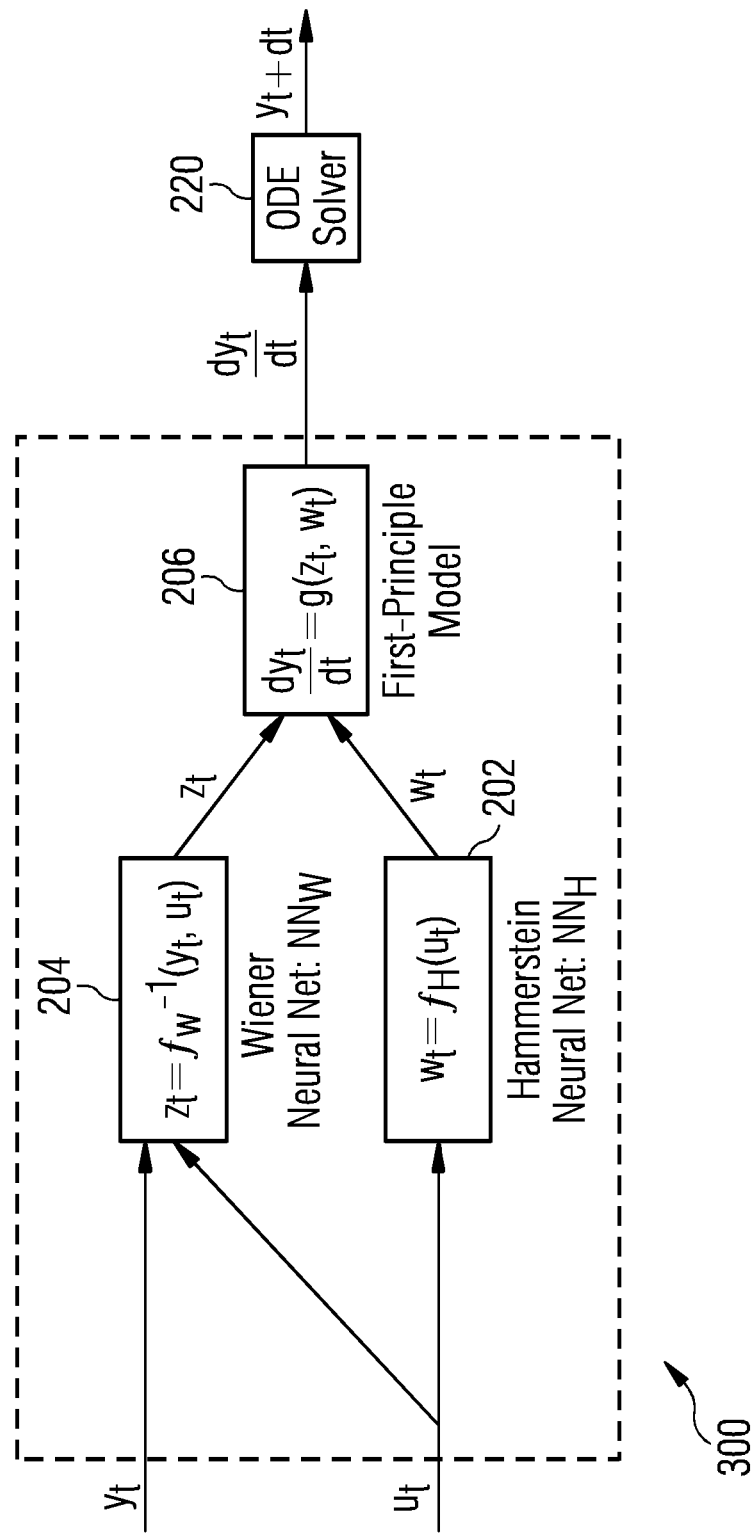
FIG. 3 shows a schematic block diagram of an alternative arrangement of elements of the system of FIG. 1.

FIG. 3 is a detailed block drawing of an alternative variant of a new artificial neural network (ANN) also termed a hybrid NODE approach which may be used to model an industrial process. The same reference numbers are used for the same blocks in FIG. 2. The ANN comprises a neural network 300 including a first nonlinear block 202, a second nonlinear block 204 and a first principle model 206. The output from the neural network 300 is input to an ODE solver block 220. In this arrangement, the industrial process being modelled is not operated in closed loop conditions and thus in contrast to the arrangement in FIG. 2, there is no PID control block 208. As with FIG. 2, the first and second nonlinear blocks may be termed the input neural block and the output neural block and the terms may be used interchangeably. The terms model and block may also be used interchangeably.

The dynamic model structure is simpler than the one in FIG. 3 and may be expressed as an ordinary differential equation:

$$\frac{dy_t}{dt} = f(y_t, u_t)$$

where $y_t$ is the output, $u_t$ is the input and f is a function modelling the system which fits the measured inputs and outputs. In this arrangement, there is no controller fixing the inputs $u_t$ and thus, the hybrid neural network model structure is simpler than the one shown above. For example, the hybrid neural network model may be expressed in more detail as:

$$w_t = f_H(u_t, \alpha)$$

$$z_t = f_w^{-1}(y_t, u_t, \beta)$$

$$\frac{dy_t}{dt} = g(z_t, w_t, \gamma)$$

$$\theta = [\alpha, \beta, \gamma]$$

where $w_t$ is the first intermediate output, $z_t$ is the second intermediate output, $u_t$ is an input from the controller or a manual input given by human (operator) or another system, $y_t$ is the output of the industrial process at the input time t, $f_H(.,\alpha)$ and $f_W^{-1}(.,\beta)$ are the first and second memoryless nonlinear blocks parametrized by the vectors $\alpha$ and $\beta$, respectively, $g(.,\gamma)$ is the model in the first principle block which is parametrized by the vector $\gamma$ and derived as explained below, and $\theta$ is the coefficient vector that parametrizes the model to fit the $U_N$ and $Y_N$ observations. The $f_H(.,\alpha)$ and $f_W^{-1}(.,\beta)$ are the same as the blocks in FIG. 2.

In both FIGS. 2 and 3, the new model structure is a Hammerstein-Wiener-like model in which the inverse of the function block $f_w$ is used and the linear block g is replaced with a general first principle block. The new hybrid neural network model structure accounts for the interactions between the inputs and outputs which is particularly useful when known disturbances are included as additional inputs.

Figure 4A:
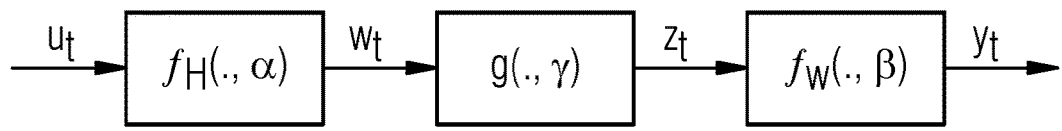
FIG. 4a shows a schematic block diagram representation of the Hammerstein-Wiener model which is adapted for the system of FIG. 1.

FIG. 4a is a block diagram representation of a Hammerstein-Wiener model which is adapted and then incorporated in the arrangements shown in FIGS. 2 and 3. Block-oriented models are widely used for nonlinear system. The Hammerstein model consists of a static non-linear element followed by a linear dynamic part. The Wiener model is the reverse of this combination so that the linear element occurs before the static nonlinear characteristic. A combination of the two models, namely the Hammerstein-Wiener model consists of a dynamic linear element sandwiched between two static nonlinear elements as described for example in "Lecture notes in control and information sciences: vol 404: Block-oriented nonlinear system identification" by Giri et al published by Springer in 2010.

The identification of the Hammerstein-Wiener model has been an active topic in academia since the 1980s (for example as described in "Identification of systems containing linear dynamic and static nonlinear elements by Billings et al published in Automatica 18(1): 15-26 1980 and "Identification of Hammerstein-Wiener models by Wills et al published in Automatica 49(1): 70-81 2013). The Hammerstein-Wiener model may be expressed as:

$$y_t = f_w(z_t, \beta)$$

$$z_t = g(w_t, \gamma)$$

$$w_t = f_H(u_t, \alpha)$$

where $u_t$ is the input, $y_t$ is the output, $f_H$ and $f_W$ are memoryless nonlinear blocks, g is a linear block and these blocks are respectively parametrized by vectors α, β and γ. Note that the modelling errors and measurement noise in the model structure have been ignored for simplicity.

In the Hammerstein model, the static nonlinear element $f_H(.,α)$ is followed by a linear dynamic part $g(.,γ)$. In the Wiener model, the linear dynamic part $g(.,γ)$ occurs before the static nonlinear element $f_W(.,β)$. The combined Hammerstein-Wiener model thus comprises a dynamic linear element $g(.,γ)$ sandwiched between two static nonlinear elements. In the arrangement of FIGS. 2 and 3, both the nonlinear blocks occur before the dynamic block $g(.,γ)$ and thus the nonlinear block from the Wiener model $f_W(.,β)$ may be considered to inverted relative to the order in the Hammerstein-Wiener model and is thus represented in the expressions above as $f_W^{-1}(.,β)$.

In the arrangements of FIGS. 2 and 3, the linear block $g(.,γ)$ in the Hammerstein-Wiener model structure is replaced with a more general first-principle model which may be a linear or nonlinear model expressed as an ordinary differential equation (ODE). In the case of using a linear first-principle model, the block $g(.,γ)$ is modelled using a linear time-invariant (LTI) system. For instance, a first-order or a second order dynamic model can be used. The first-order plus time delay (FOPTD) is the simplest form of the dynamic model, widely used in process engineering. The FOPTD model is defined by the following ODE:

$$\tau \frac{dz_t}{dt} = K_p w_t(t - \theta_p) - z_t$$

where $K_p$ is the steady-state gain, τ is the time constraint, and $θ_p$ is the time delay. In the Laplace Domain, the first-order system is a transfer function:

$$G(s) = \frac{Z(s)}{W(s)} = \frac{K_p}{\tau s + 1} e^{-\theta s}$$

The second-order system, which is a common description of many dynamic processes, is defined as follows:

$$\tau_s^2 \frac{d^2 z_t}{dt^2} + 2\xi \tau_s \frac{dz_t}{dt} + z_t = K_p w_t(t - \theta_p)$$

This second order differential equation has output z(t) and four unknown parameters. The four parameters are the gain $K_p$, damping factor ξ, the second order time constrain $τ_s$, and dead time $θ_p$. The transfer function for the second-order model is in the form:

$$G(s) = \frac{Z(s)}{W(s)} = \frac{K_p}{\tau_s^2 s^2 + 2\xi \tau_s s + 1} e^{-\theta s}$$

The second order differential equation can be split into two first order differential equations, which is referred to as the state-space form:

$$\dot{x}_1 = x_2$$

$$\dot{x}_2 = \frac{1}{\tau_s^2}(K_p u(t - \theta_p) - 2\xi \tau_s x_2 - x_1)$$

where $x_1$ is the measured output z(t) and $x_2$ (i.e. derivative of z(t)) is a helper state variable.

Figure 4B:
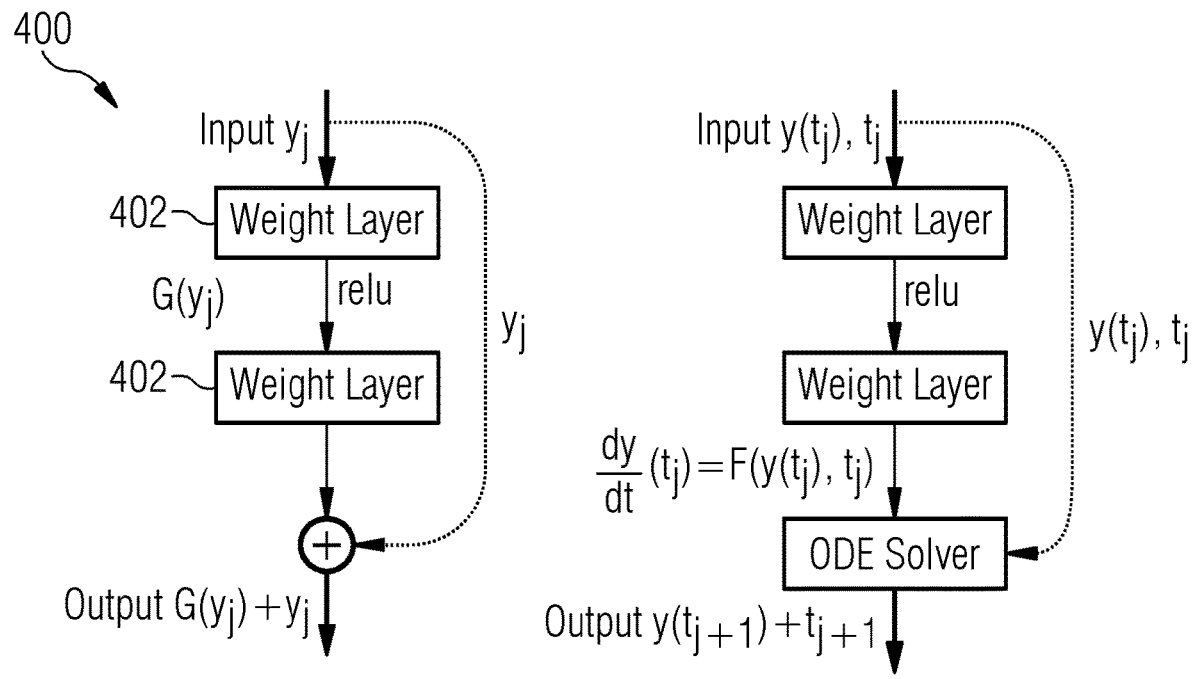
FIG. 4b compares a schematic block diagram of a ResNet and the neural ordinary differential equation (NODE) which is adapted for the system of FIG. 1.

FIG. 4b compares a schematic representation of the NODE approach used in FIG. 2 or FIG. 3 with a known residual network (ResNet) (for example as described in "Deep Residual Learning for Image Recognition" by He et al published in Computer Vision and Pattern Recognition in 2016). A residual network is a deep neural network formed from stacking simple residual blocks which contain identity skip connections that bypass the residual layers. A residual block 400, as shown on the left of FIG. 4b, can be written as:

$$y_{j+1} = y_j + G(y_j, \theta_j) \text{ for } j = 0, \ldots, N-1$$

where $y_j$ is the feature map at the jth layer, $θ_j$ represents the jth layer's network parameters, G is referred to as a residual module and in this example consists of two convolution layers 402. Without losing generality, a parameter h can be added so that the residual module can be rewritten as G=hF (for example, as described in "Multi-Level Residual Networks from Dynamical Systems View" by Change et al published in the Sixth International Conference on Learning Representations in 2018. The residual block becomes:

$$y_{j+1} = y_j + hF(y_j, \theta_j)$$

which can be rewritten as:

$$\frac{y_{j+1} - y_j}{h} = F(y_j, \theta_j)$$

For a sufficiently small h, the above equation may be regarded as a forward Euler discretization of the initial value ODE:

$$\dot{y}(t) = F(y(t), \theta(t)), \, y(0) = y_0 \text{ for } 0 \leq t \leq T$$

where time t corresponds to the direction from input to output, y(0) is the input feature and y(T) is the output feature map. Thus, the problem of learning the network parameters, θ, is equivalent to solving a parameter estimation problem or optimal control problem involving the ODE in the equation above.

The new parameter h is called the step size of the discretization. In the original formulation of the equation for ResNet, h does not exist and is implicitly absorbed by the residual module G. h may be called the implicit step size. ResNets equally discretize [0, T] using time points $T_0, T_1, \ldots, T_j, \ldots T_d$, where $T_0=0$, $T_d=T$ and d is the number of blocks. Thus, each time step is $$h = T_{j+1} - T_j = \frac{T}{d}$$

For the accuracy of the ResNet network, the step size h should be a small value. Therefore, to use a ResNet network to model a dynamic system over a long time horizon [0,T], the number of required ResNet blocks d will be very large and not practical.

The Neural Ordinary Differential Equations (NODE) approach which forms the basis of the hybrid NODE model used in FIG. 2 or FIG. 3 is a new family of artificial neural networks which is described for example in "Neural Ordinary Differential Equations" by Chen et al published in the 32$^{nd}$ conference on Neural Information Processing Systems (NeurIPS 2018). This new family of ANNs is based on the notion that the skip connections in ResNet can be seen as a realization of Euler's method for numerically solving ODEs. As shown in the right hand side of FIG. 4b, instead of letting the network learn the residuals between fixed points as in ResNet, NODE parameterizes the local derivation of the input data with a neural network block. The ODE solver of FIG. 2 or 3 takes the steps from an input $y_j$ at time $t_j$ to an output $y_{j+1}$ at time $t_{j+1}$, with the derivative at each point fed to the ODE solver.

One of the advantages of the NODE approach used in the present approach compared to ResNet lies in the choice of the ODE solver. By building NODE with an ODE solver with an adaptive size, it is possible to handle time-series data with irregular time stamps. Thus, it is possible to trade off accuracy for speed by taking larger time steps.

This adaptive NODE approach is illustrated in the right hand side of FIG. 4b which shows that the inputs are $y(t_j)$ and $t_j$ which is an adaptive time step. The output from the ANN is:

$$\frac{dy}{dt}(t_j) = F(y(t_j), t_j)$$

In other words, the ANN block learns the local derivative at the input $y(t_j)$ which is necessary for the ODE solver to step to the output $y(t_{j+1})$. The underlying ODE of the data is directly encoded in the ANN block during training. After training, NODE can take any point y(t) as input to predict the next point y(t+Δt) after time Δt by taking steps in the ODE solver, based on the information about the derivative encoded in the ANN block. This means that NODE is predicting the dynamics of the unknown system (for example in line with "Modelling Dynamical Systems Using Neural Ordinary Differential Equations: Learning ordinary differential equations from data using neural networks" a Masters Thesis by Karlsson and Svanstrom published in Chalmers University of Technology in 2019).

Merely as an example, the hybrid node approach of FIG. 2 is implemented to model an industrial process in one of the standard processing units at oil production facilities—the gravity separator.

Figure 5:
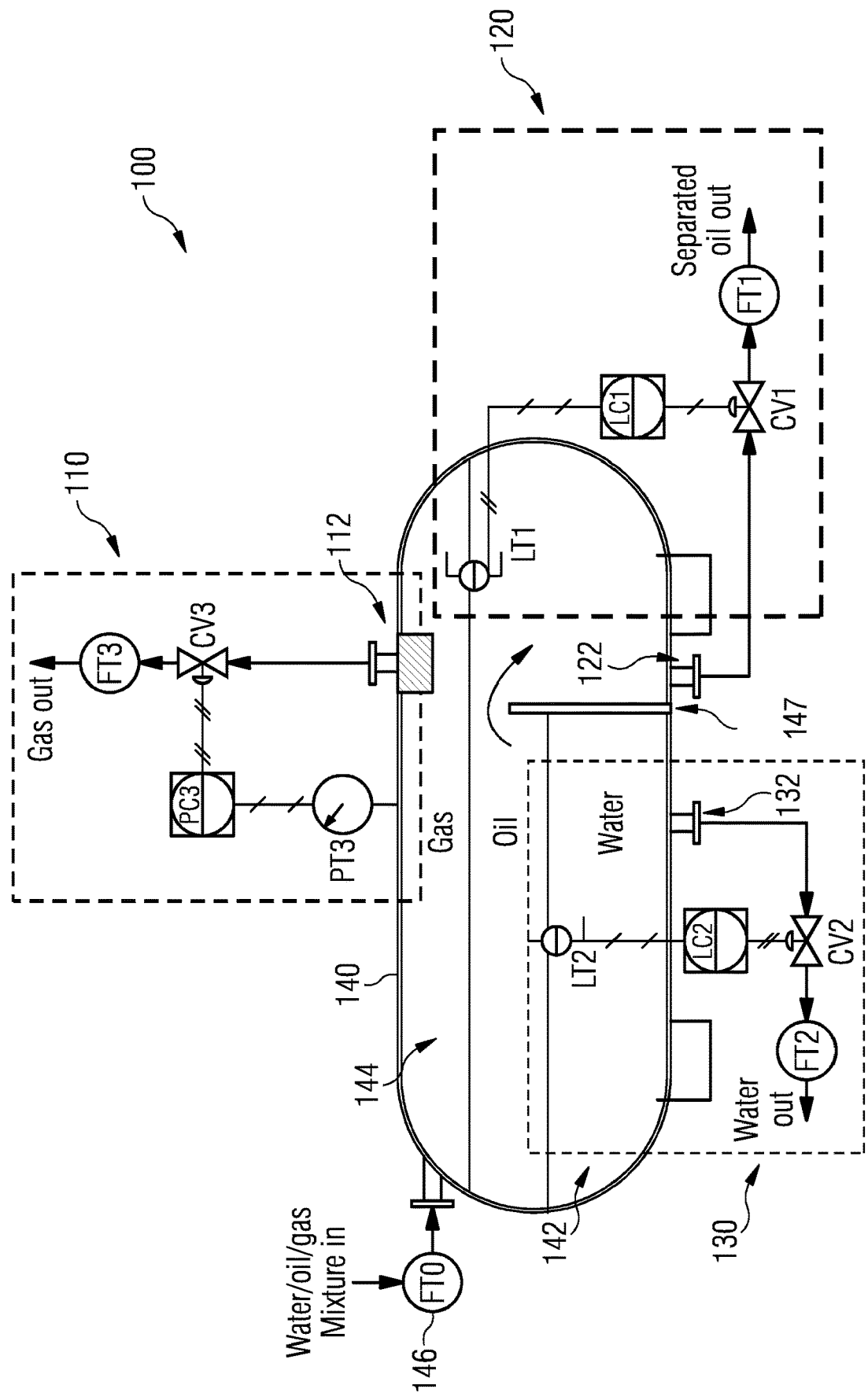
FIG. 5 is a schematic diagram of a separator which can be modelled using the system of FIG. 1.

FIG. 5 illustrates a separator 100 which comprises a large horizontal tank 140 having an inlet 146 which receives a mixture of oil, gas and water. The separator 100 is connected to a gas control system 110 for drawing off gas, an oil control system 120 for drawing out oil and a water control system 130 for drawing out water. The tank 140 comprises a gas outlet 112 to the gas control system 110, an oil outlet 122 to the oil control system 120 and a water outlet 132 to the water control system 130. The abbreviations used in FIG. 5 are CV: control valve, PC: pressure controller, LC: level controller, FT: flow transmitter (flow-rate measuring instrument), LT: level transmitter and PT: pressure transmitter.

Flow of separated gas through the gas outlet 112 is controlled by a valve CV3 which is opened and closed by a pressure controller PC3. Gas flows through the gas control system to a gas outlet FT3. Similarly, flow of separated oil through the oil outlet 122 is controlled by a valve CV1 which is opened and closed by a level controller LC1. Oil flows through the oil control system to an oil outlet FT1.

Flow of separated water through the water outlet 132 is controlled by a valve CV2 which is opened and closed by a level controller LC2. Water flows through the water control system to a water outlet FT2.

The basis for the operation of the gravity separator is that oil and water have different densities. With gravity and passing time, heavier water 142 will gather at the bottom of the tank 140, and lighter oil 144 will collect above. Water 142 is separated from the oil outlet by a partition weir 147. At the bottom of the separator, the water will be blocked from the oil outlet 122 while oil flows over the partition weir 147. Bubbles of gas in the crude will rise to the surface over time and accumulate on the top to be drawn out through the gas outlet 112.

The control of water-level, oil-level, and gas pressure is needed to make the separation work optimally (for example as described in Studies in Autotuning. By Mork et al published in 2012 as a Bachelor Thesis, Høgskolen i Sør-Trøndelag). Each of the control systems thus typically comprises a sensor, for example a gas pressure sensor PT3 in the gas control system, an oil level sensor LT1 in the oil control system and a water level sensor LT2 in the water control system. 'Oil In Water' (OIW) sensors may also be used to monitor the separation performance. Excessive oil in the water (or vice versa, water in oil) can lead to process shutdown. If the water level is allowed to rise above the dividing weir, water might flow over and out of the oil outlet. A gas blowout is the most common cause of a shutdown. The gas blowout is caused by a low oil level so that the gas flows out through the oil output. Fewer shutdowns mean that less oil production is lost, and more oil production means more money.

The control performance (i.e., tracking setpoints and smooth operation) is essential to operate the separator in an economically optimal way. Optimal tuning of the controllers PID parameters will ensure that the process variables are stable, contributing to a smoother and safer operation with fewer shutdowns. A relatively accurate dynamic model is needed for control design and optimal tuning to improve safety and control performance.

Figure 6:
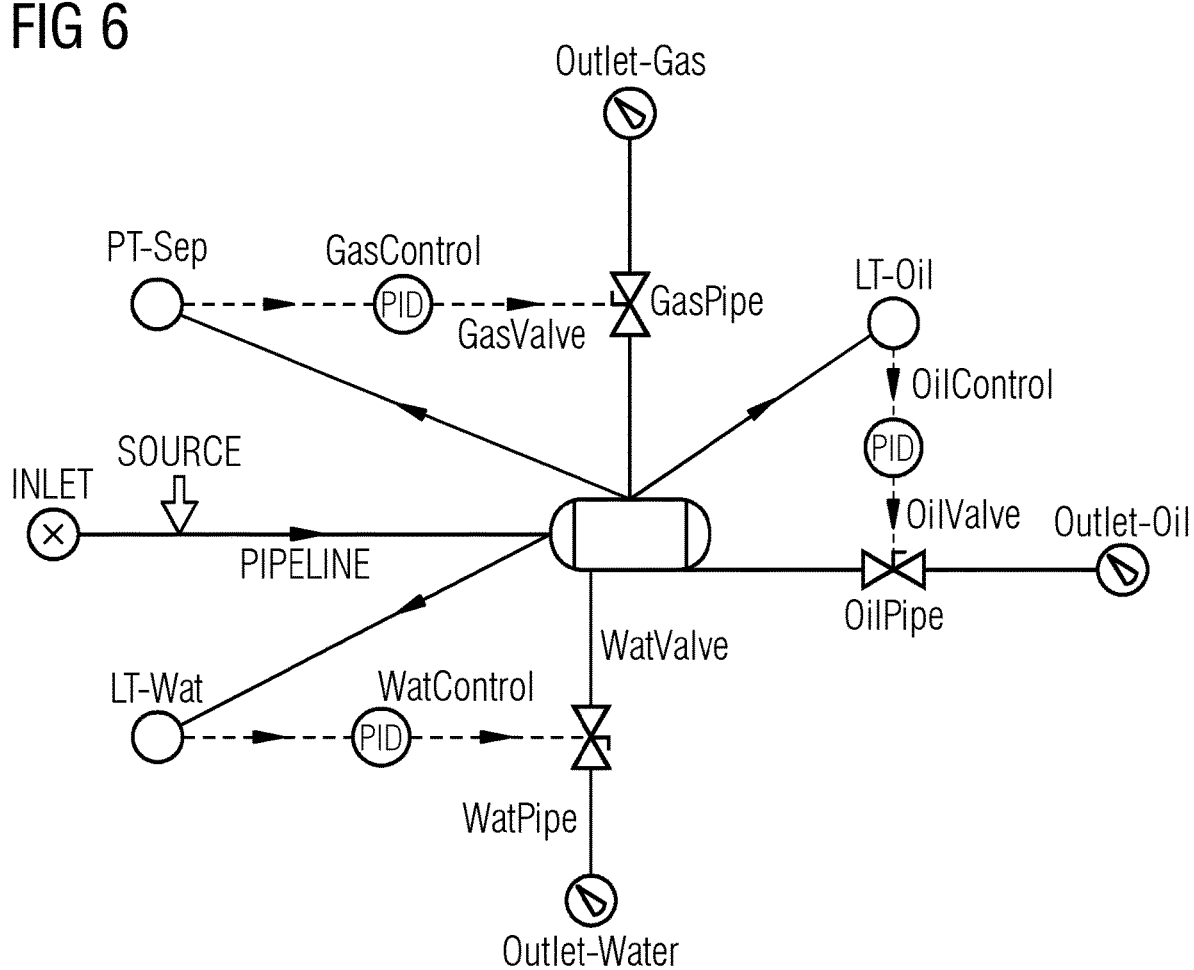
FIG. 6 is a schematic diagram of the separator of FIG. 5 as modelled by a standard model.

FIG. 6 illustrates a simulation of the three-phase separator and its controllers. The simulation is generated using the OLGA simulator which is the industry-leading dynamic multiphase flow simulator owned by Schlumberger. The simulated separator is horizontal with 3.7 m diameter and 20 m length. The nominal values of the simulated separator process are given in the table below.

|  | Nominal value | Eng. Unit |
|---|---|---|
| Separator length | 20 | m |
| Separator diameter | 3.7 | m |
| Oil inflow rate (at standard conditions) | 400 | Sm3/h |
| Oil inflow mass rate | 97.23 | kg/s |
| Water inflow rate (at standard conditions) | 250 | Sm3/h |
| Water inflow mass rate | 69.37 | kg/s |
| Gas inflow rate (at standard conditions) | 64800 | Sm3/h |
| Gas inflow mass rate | 14.20 | kg/s |
| Oil level setpoint | 2.0 | m |
| Water level setpoint | 1.0 | m |
| Gas pressure setpoint | 40.0 | bar |

The data from the separator process are obtained when the process is in operation in closed-loop conditions. That is, three PID regulators, with known parameters, control the separator. The three PI controllers in the OLGA simulator were initially tuned by trial and error to get a stable response for generating training data and validating the models. These parameters are given in the table below.

|  | Proportional gain [—] | Integral time [sec] |
|---|---|---|
| Oil control | −0.4 | 750 |
| Water control | −1.0 | 600 |
| Gas control | −0.1 | 120 |

Similarly, the industrial process illustrated in FIGS. 5 and 6, and in particular the three PID regulators, may be modelled using the hybrid NODE model described above. The process is a Multi-Input Multi-Output (MIMO) system. The oil and water levels and the gas pressure represent three outputs $y_r$. The six inputs are the inflow rates of oil, water, and gas which are considered known disturbances $d_r$, and the three setpoints $r_r$. The inputs may also be known as the Degrees of Freedom (DOF). The closed-loop separator process thus has six DOF: three setpoints and three inflow disturbances.

The physics associated with the closed-loop separator process may be modelled using first-order mechanistic models for the measured outputs (one state per measurement), there are three state variables. In addition, the six inputs (DOF) are augmented into the state vector and there are three state variables for the three PI controllers (integral of control error). Thus, the augmented Neural ODE system will have 12 state variables in total. The model for the first-principle block of the Neural ODE model is defined by the following ordinary differential equations:

$$\frac{dy_{oil}}{dt} = \frac{(K_{po}u_{oil} - y_{oil}) + K_{do}d_{oil} + K_{wo}y_{wat} + K_{go}y_{gas}}{\tau_{oil}}$$

$$\frac{dy_{wat}}{dt} = \frac{(K_{pw}u_{wat} - y_{wat}) + K_{dw}d_{wat} + K_{ow}y_{oil} + K_{gw}y_{gas}}{\tau_{wat}}$$

$$\frac{dy_{gas}}{dt} = \frac{(K_{pg}u_{gas} - y_{gas}) + K_{dg}d_{gas} + K_{og}y_{oil} + K_{wg}y_{wat}}{\tau_{gas}}$$

First-order models are used with $K_{po}$, $K_{pg}$ and $K_{pw}$ are the steady-state process gains with respect to the control inputs $u_{oil}$, $u_{gas}$ and $u_{water}$, $\tau_{oil}$, $\tau_{gas}$ and $\tau_{water}$ are the time constants, and $K_{do}$, $K_{dg}$ and $K_{dw}$ represent the effect of the input disturbances $d_{oil}$, $d_{gas}$ and $d_{water}$. There are also linear terms for interactions between different phases. For example, $K_{wo}$ and $K_{go}$ represent the effects of the gas and water outputs $y_{gas}$ and $y_{water}$ when modelling the derivative for the oil output $y_{oil}$. Similarly, $K_{ow}$ and $K_{gw}$ represent the effects of the oil and gas outputs $y_{oil}$ and $y_{gas}$ when modelling the derivative for the water output $y_{water}$. Finally, $K_{og}$ and $K_{wg}$ represent the effects of the oil and water outputs $y_{oil}$ and $y_{wat}$ when modelling the derivative for the gas output $y_{gas}$.

The neural blocks in the hybrid Neural ODE model may be modelled using feedforward sequential neural networks. Any general feed-forward neural network may be used and merely as a non-limiting example, the Keras module of the TensorFlow library may be used to build the nonlinear blocks, as given below.

F=tf.keras.Sequential( )
F.add(keras.layers.Dense(24, input_shape=(9,), activation='tanh')) F.add(keras.layers.Dense(64, activation='relu')) F.add(keras.layers.Dense(64, activation='tanh')) F.add(keras.layers.Dense(64, activation='relu')) F.add(keras.layers.Dense(64, activation='tanh'))
F.add(keras.layers.Dense(3, activation='tanh', kernel_initializer='zeros'))

For comparison, the proposed Hybrid NODE model outlined above and the original OLGA simulation are compared with a purely linear ODE model which uses only the three differential equations above (i.e., without the nonlinear blocks) and a Neural ODE model such as that shown in FIG. 4b that only consists of a Multi-Layer Perceptron (MLP) network and does not integrate the Hammerstein-Wiener model.

FIGS. 7a to 9c plot simulation results which are used as a training dataset together with various model outputs. To generate the training data, step changes to the DOF of the Olga model are applied. The simulation time was 100 hours, but 10,000 sec initial transients were discarded. The training dataset contains 35,000 data points for each measurement with a sampling interval of 10 sec that is about 97.22 hours long. The six target features to train the models are the oil and water levels, the gas pressure, and the three controller signals. Since the process operates in closed-loop conditions, the three measured variables always track the given setpoints, and thus do not provide an adequate error measure for the model fitting. Therefore, it is necessary to include the control signals in the cost. The Mean-Square Error (MSE) between the measurements and the model output may be used as the cost function. At each training epoch, a batch of 1000 data points with a random starting point is used. Therefore, the cost function to minimize is formulated as follows:

$$J = \frac{1}{N}\sum_{k=1}^{N}\left[(y_t[k] - \hat{y}[k])^2 + (u_t[k] - \hat{u}[k])^2\right]$$

where N is the batch size, $\hat{y}$ and $\hat{u}$ are the model outputs for the measurements and the controller signals, respectively. The model training may be performed using any suitable optimizer such as the Adam optimizer (for example as described in A Method for Stochastic Optimization by Kingma et al published in the 3rd International Conference for Learning Representations in 2015) from the TensorFlow library (Abadi, Agarwal et al. 2015).

FIGS. 7a and 7b show that the results of the various models have significant overlap when modelling the oil level change and the control signal for the oil PID controller over time, respectively. FIG. 7c shows the change in oil flow over time. Similarly, FIGS. 8a and 8b show that the results of the various models have significant overlap when modelling the water level change and the control signal for the water PID controller over time. FIG. 8c shows the change in water flow over time. Similarly, FIGS. 9a and 9b show that the results of the various models have significant overlap when modelling the gas pressure change and the control signal for the gas PID controller over time. FIG. 9c shows the change in gas flow over time. The greatest variation is shown in the linear ODE model which cannot describe the nonlinear behaviour. The inflow rates shown in FIGS. 7c, 8c and 9c are independent variables (i.e. disturbances) which are not generated by the control system.

FIGS. 10a to 12c plot simulation results from the various models using a new dataset with setpoint and disturbance values different from the training dataset to validate the models. As with the results based on the training data, the simulation results in FIGS. 10a to 12c compare the simulation results of the three different models: linear ODE, MLP node and hybrid neural ODE model (labelled hybrid node) with the reference process in OLGA.

Figure 12A:
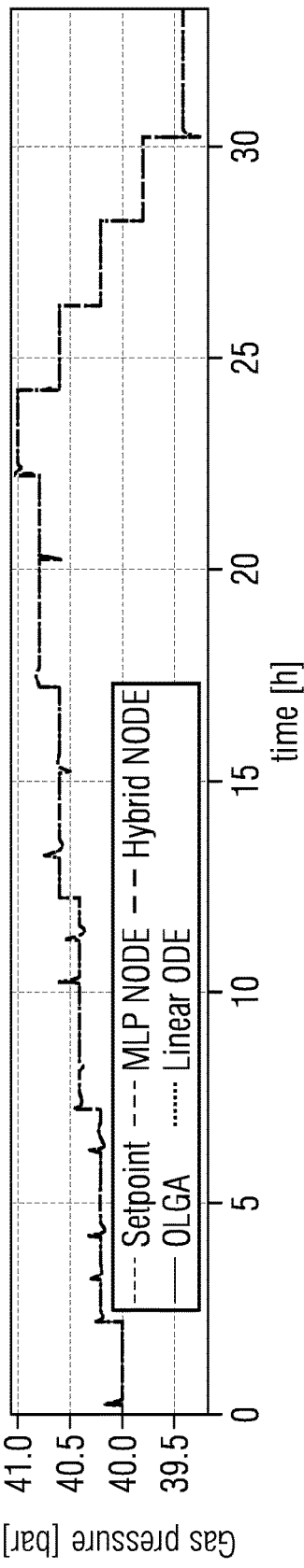
FIGS. 12a, 12b and 12c are graphs plotting the variation in gas pressure (bar), control signal and gas inflow (kg/s) with time for the validation data for the gas level controller in FIG. 5 or 6.
Figure 12B:
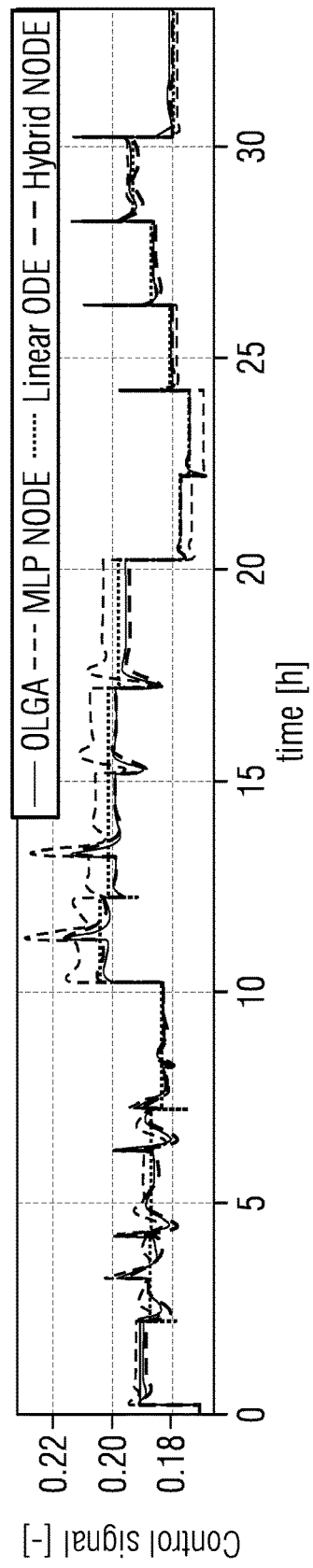
Figure 12C:
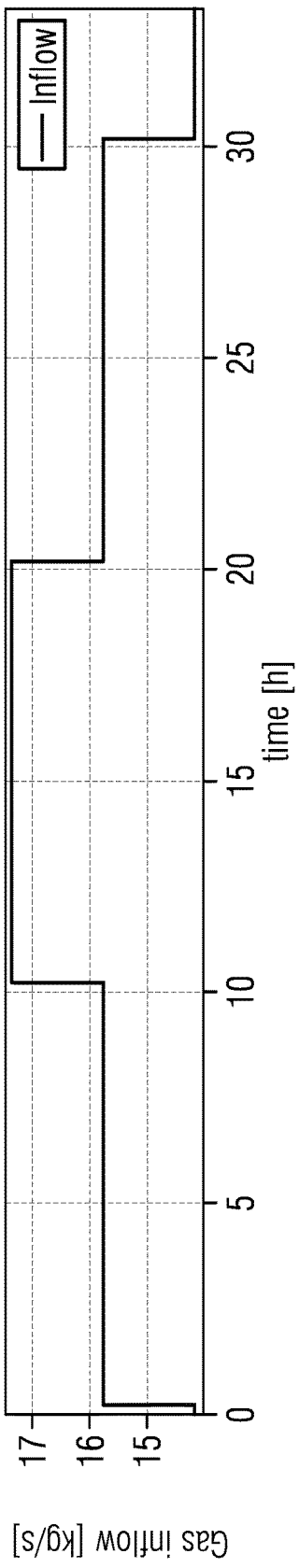

FIGS. 10a and 10b plot the variation in oil level and the control signal for the oil PID controller over time, respectively. FIG. 10c shows the change in oil flow as it varies over time. FIGS. 11a and 11b plot the variation in the water level and the control signal for the water PID controller over time. FIG. 11c shows the change in water flow as it varies over time. FIGS. 12a and 12b plot the variation in the gas pressure change and the control signal for the gas PID controller over time. FIG. 12c shows the change in gas flow as it varies over time. As above, the inflow rates shown in FIGS. 10c, 11c and 12c are independent variables (i.e. disturbances) which are not generated by the control system.

As described above, the hybrid neural ODE model includes both linear and nonlinear blocks and as shown in FIGS. 10a to 12c predict the behaviour of the process's more accurately than the two other models. In validating the model, it is noted that the measured outputs (levels and pressure) are regulated on the same given setpoints. Therefore, the measured outputs look very similar for all models. However, the control signals resulting from different models can be examined for a visual comparison. The MLP NODE does not have a good prediction capability for new conditions (setpoints and inflow rates). This problem is due to the overfitting issues of the MLP models.

Due to nonlinearity, the process gain varies by changing the operating point. This effect leads to the linear model's poor performance when operating on different setpoints than the training dataset. However, the Hybrid NODE model can capture the nonlinear behaviour with fair accuracy. The Hybrid NODE approach can also represent the interaction between the oil, water, and gas phases better than the linear ODE model.

The Mean-Square Error (MSE) of the three models for both the training and the validation dataset are presented in the table below:

|  | Training MSE | Validation MSE |
| --- | --- | --- |
| Hybrid node model | 0.00013 | 0.00619 |
| MLP node model | 0.00039 | 0.10938 |
| Linear ODE | 0.02434 | 0.06192 |

Both the hybrid NODE and MLP NODE models give similar results for the training MSE. However, the linear ODE model cannot describe the nonlinear behaviour and thus has different results for the MSE. The Linear ODE has a lower MSE on the validation dataset than the MLP NODE, despite having a higher MSE in training. Unlike MLP models, simple mechanistic models with few parameters do not suffer from the overfitting problem.

Figure 13:
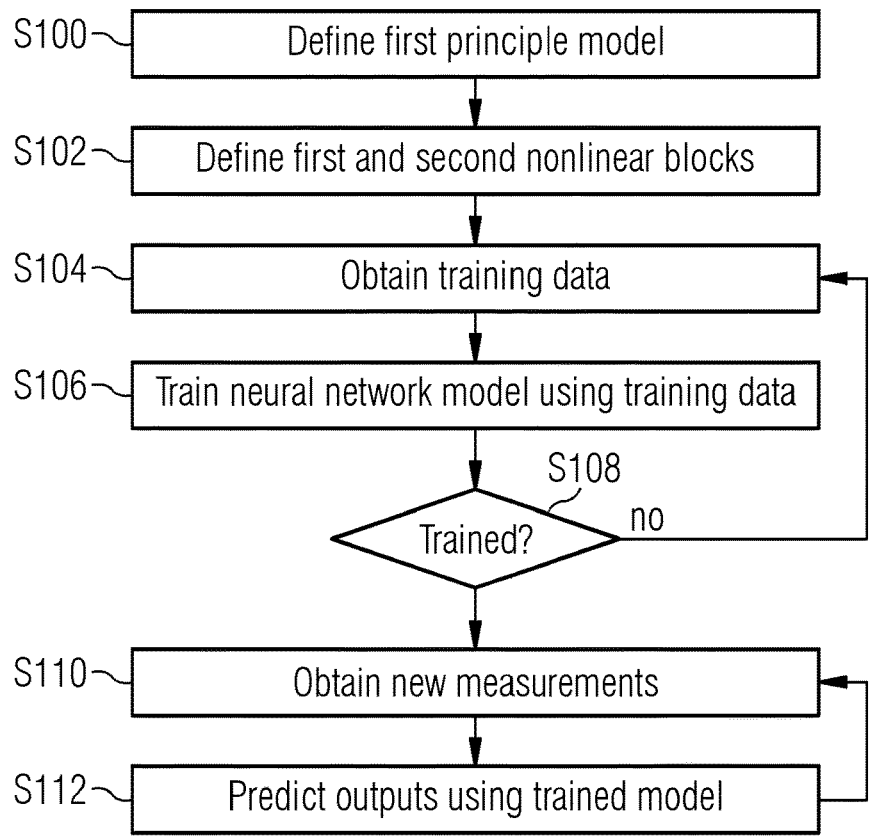
FIG. 13 is a flowchart of a method which may be implemented in the system of FIG. 1.

FIG. 13 is a flowchart of the hybrid NODE approach of the present techniques. The hybrid neural network model used in the approach defines the model for the industrial process which has been trained as described below. In a first step S100, a generic model defining the first-principle model (also known as first principle block) is specified. The first principle model may be a linear or nonlinear model which describes the dynamics (i.e. the physics) of the industrial process. For example, the first principle model may include one or more ordinary differential equations which may be first or second order. The first principle model may be obtained from a library or other source. Alternatively, the first principle model may be defined based on a rough understanding of underlaying physics of the process, the inputs (degrees of freedom) and the outputs. For example, for the case study above, the oil level, the water level and the gas pressure which are measured by the appropriate sensors are the three outputs (within the vector $y_t$). The inflow rates of oil, water and gas are considered known disturbances and there are also three setpoints. The disturbances and the setpoints are the inputs. An ordinary differential equation may be defined for each of the measured outputs. The equation may include steady-state process gains and time constants together with the effects of the disturbances and additional terms to represent interaction between the different phases.

The next step is S102 and the first and second nonlinear block (also known as input and output neural blocks) $f_H$ and $f_W^{-1}$ are defined using Neural Network Layers. As explained above, the first-principle model is connected to the first and second nonlinear blocks whereby the overall hybrid neural network model is defined as: $w_t = f_H(u_t, \alpha)$ (open loop process) or $w_t = f_H(u_t, d_t, \alpha)$ (closed loop process)

$$z_t = f_w^{-1}(y_t, u_t, \beta)$$

$$\frac{dy_t}{dt} = g(z_t, w_t, \gamma)$$

$$\theta = [\alpha, \beta, \gamma]$$

where $u_t$ is an output from the controller (control block) in a closed loop process $u_t = c(y_t, r_t)$ or one of the measured inputs for an open loop process, $w_t$ is the first intermediate output, $z_t$ is the second intermediate output, $y_t$ is the output and $d_t$ is the input disturbance (used and measured in the closed loop process), $f_H(.,\alpha)$ and $f_W^{-1}(.,\beta)$ are the first and second memoryless nonlinear blocks parametrized by the first and second vectors $\alpha$ and $\beta$, respectively, $g(.,\gamma)$ is a model for the first principle block which is parametrized by the third vector $\gamma$ and derived as explained below, and $\theta$ is the coefficient vector that parametrizes the model to fit the $U_N$ and $Y_N$ observations (i.e. the set of training observations).

The next step S104 is obtain data to train the overall hybrid neural network model. An example of how the training data may be obtained is described above in the case study. The training data contains measurements of inputs and the associated outputs. It will be appreciated that although steps S100 to S104 are shown sequentially, they may be done in parallel or in a different order.

The next step S106 is to train the hybrid neural network model using the training data. This step estimates a coefficient vector $\theta$ which fit the inputs and outputs within the hybrid neural network model prediction to the measurements of the inputs and outputs within the training data. In the open loop process the inputs are represented by $u_t$ and in the closed loop mode these inputs $u_t$ are set by the controller and additional inputs such as the disturbances and the setpoints are also included. There may be a determination at step S108 to ensure that the model has been adequately trained. For example, validation data may be used to confirm that the model is accurate.

Once the hybrid neural network model has been trained to fit the observations, additional measurements of the input(s) (and output(s) where measured outputs are used) at fixed or input time(s) may be obtained at step S110 and the hybrid neural network model may then be used to predict future behaviour of the industrial process at subsequent time steps S112, i.e. the output at a subsequent point in time. The subsequent point in time may be any suitable length, e.g. minutes or hours. The predicted output may be output, e.g. to a user interface or to a controller (when used in the closed loop process) and may be used in any appropriate manner, e.g. to determine adjustments to improve the operation of the industrial process and/or may be used for Condition Monitoring where the system may issue alerts if the measured process output deviates from the predicted (expected) output. Also, the predicted output may be used as a "soft" sensor, if a physical sensor fails. This may then be iteratively repeated for subsequent time steps. As explained in detail above, the prediction may be done by outputting a derivative $dy/dt(t_j)$ at the input point $y(t_j)$ and inputting this derivative to the ODE solver so that the final output is $y(t_{j+1})$. In other words, any measurement $y(t)$ taken at an input time can be used to predict the next time point $y(t+\Delta t)$. When using the hybrid neural network model for prediction, only the initial condition of the outputs $y(0)$ is specified. Then the predicted output at each step $y(t+\Delta t)$ is used as the $y(t)$ input for the next step. It will also be appreciated that other machine learning techniques may be used to predict control signals but in this case, the controller signal is calculated by the controller with known parameters.

The hybrid NODE approach of the present techniques thus formulates the Hammerstein-Wiener model in a neural ODE form. As described above, this is achieved by significant changes, namely using a first-principle block and by using the inverse of one of the functional blocks in the Hammerstein-Wiener model. The proposed hybrid neural network model structure allows the combination of simple first-principle models with neural network models. This allows an accurate dynamic model for an industrial process, e.g. the three-phase separator process of the example above, to be developed. The model accuracy on different validation datasets confirms the potential of using the proposed hybrid model structure as a general-purpose model for plants with control loops.

An advantage of the hybrid neural ODE model is that the model weights for both the first principle and neural blocks may be simultaneously trained using efficient optimisation tools such as those in the TensorFlow library. Also the neural ODE's advantages compared to an LSTM or ResNet is that the feedback control may be incorporated into the model directly. This makes the hybrid NODE approach suitable for application in the process industry, especially the control systems design.

One of the dynamic modelling challenges is the non-linearity of the processes because the process gain changes for different operation conditions. The proposed approach handles nonlinearity with reasonable accuracy but does not suffer from overfitting because of including a physical representation in the model structure. The approach can also model the interaction between different process variables.

Figure 14:
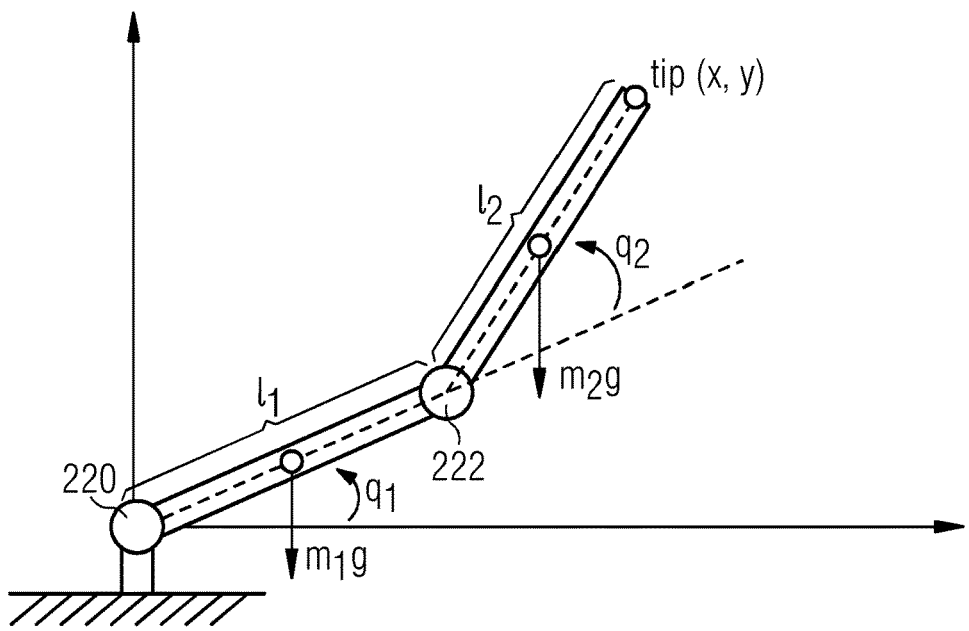
FIG. 14 is a schematic illustration showing a two degrees-of-freedom robotic arm.

FIG. 14 illustrates a second industrial process which can be predicted using the techniques described above. FIG. 14 shows a robotic arm having two degrees of freedom which is also known as a two-link planar manipulator. This is a well-known example in mechanical engineering and robotics literature and is described for example in Chapter 9 Control by Ivanescu of the Mechanical Engineer's Handbook published in 2001 or in the "Theory of Applied Robotics: Kinematics, Dynamics and Control (2nd edition) by Jazar published in 2010.

Two controllers (220, 222) are used to drive the robot on planned trajectories. The controllers may be PID controllers or any other suitable controller. The inputs to the system are torque applied to the joints to move the links, and the controlled outputs are the angles ($q_1$ and $q_2$) of the two links ($l_1$ and $l_2$). It is also possible to measure the angular velocity of the two links ($w_1$ and $w_2$). The position (x,y) of the end tip may be calculated from the angles and the lengths of the two arms using a "forward kinematics" transformation.

Figure 15:
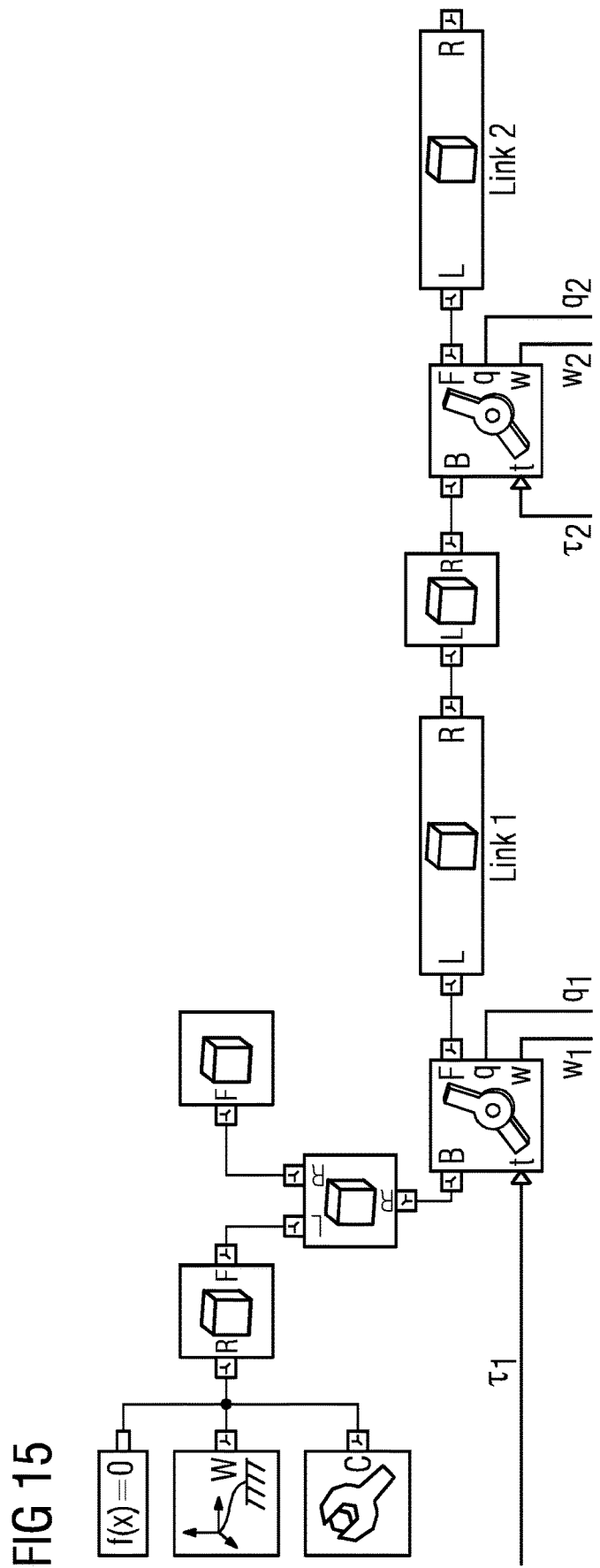
FIG. 15 is a schematic illustration of the robotic arm of FIG. 14 simulated in Matlab.

FIG. 15 is a schematic illustration of a simulation of the robotic arm in FIG. 14. In this example, the simulation is performed in the Simulink environment of Matlab using the Simscape Multibody™ library but it will be appreciated that this is just an illustrative approach. Using the simulation, it is possible to model multibody systems using blocks representing bodies, joints, constraints, force elements and sensors. The simulation formulates and solves the equations of motion for the complete mechanical system. The first joint is connected to the origin location known as "the world frame". Two PI controllers have been added to the Simulink model to control the angles by manipulating the two torque inputs. Both PI controllers are set with a proportional gain of 200 and an integral time of 10 seconds. The parameters of the simulated model are shown in the table below:

| | Symbol | Nominal Value | Eng. Unit |
| --- | --- | --- | --- |
| Link 1 length | $l_1$ | 1 | m |
| Link 2 length | $l_2$ | 1 | m |
| Link 1 mass | $m_1$ | 22.5 | kg |
| Link 2 mass | $m_2$ | 22.5 | kg |
| Joint 1 equilibrium position | $q^*_1$ | 0 | deg |
| Joint 1 equilibrium torque | $\tau^*_1$ | 151.72 | N · m |
| Joint 1 spring stiffness | $k_1$ | 1 | N · m/deg |
| Joint 1 damping coefficient | $c_1$ | 2 | N · m/(deg/s) |
| Joint 2 equilibrium position | $q^*_2$ | 0 | deg |
| Joint 2 equilibrium torque | $\tau^*_2$ | 36.77 | N · m |
| Joint 2 spring stiffness | $k_2$ | 0.5 | N · m/deg |
| Joint 2 damping coefficient | $c_2$ | 0.7 | N · m/(deg/s) |

The rigorous first principle models for the robotic arms with multiple degrees of freedom have been studied in the literature, for example in "Theory of Applied Robotics: Kinematics, Dynamics and Control ($2^{nd}$ edition) by Jazar published in 2010. In the methodology described above, we apply a different approach where a generic first-principle model similar to the first and second order differential equations described above in relation to FIGS. 2 and 3. As in the separator process example described above, the hybrid nature of the model structure of FIG. 2 allows the use of generic first principle models combined with neural networks. The two angles $q_1$ and $q_2$ and the two velocities wi and we are the outputs $y_t$ and the two setpoints for the angles $r_t$ are the two degrees of freedom or inputs to the model. No disturbance is considered for this example.

It is well known that velocity is the rate of change (time derivative) of the position. Accordingly, in this example. We use second-order mechanistic models for the measured outputs to relate the links' angles q and their velocities w. There are thus four state variables (angle and velocity of each link) for the first principle block. The two inputs (degrees of freedom) are augmented and there are the state variables for the two controllers (integral of control error). Accordingly, the closed loop neural ODE model will have eight state variables in total. The differential equations for the first-principle block may be expressed as:

$$\dot{q}_1 = w_1$$

$$\dot{w}_1 = \frac{1}{\tau_{s1}}\left(\frac{k_{p1}}{\tau_{s1}}u_1 - 2\xi_1 w_1 - \frac{q_1}{\tau_{s1}} - c_{12}w_2 - \frac{k_{12}q_2}{\tau_{s1}}\right)$$

$$\dot{q}_2 = w_2$$

$$\dot{w}_2 = \frac{1}{\tau_{s2}}\left(\frac{k_{p2}}{\tau_{s2}}u_2 - 2\xi_2 w_2 - \frac{q_2}{\tau_{s2}} - c_{21}w_2 - \frac{k_{21}q_1}{\tau_{s2}}\right)$$

The parameters $K_{p1}$ and $K_{p1}$ are the steady state process gains with respect to the control inputs (torque). Similar to the equations for the generic second order equation, $\tau_{s1}$ and $\tau_{s2}$ are the second order time constants and $\xi_1$ and $\xi_2$ are the damping factors. There are additional terms to account for the interactions between the two links, namely $c_{12}$, $C_{21}$, $k_{12}$, $k_{21}$. The neural blocks which are used are the same as for the separator model.

The closed-loop system has two degrees of freedom: two setpoints for the link angles. Training data is needed to train the model. Sinusoidal signals with variable amplitude are applied to the setpoints of the Matlab model described above to generate the training data. The simulation time was 20,250 seconds but 250 second initial transients were discarded. Due to the fast dynamics of the system, the Matlab model is relatively stiff. Therefore a variable step-size solver (ODE 45) is used to simulate the robot model. The training dataset contains 202,786 data points for each measurement.

Figure 16A:
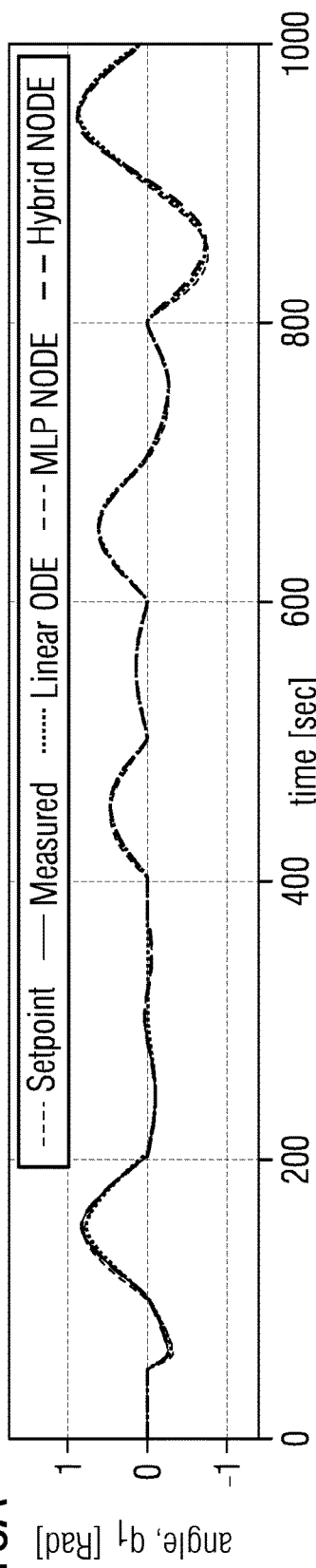
FIGS. 16a, 16b and 16c are graphs plotting the variation in angle (rad), velocity (Rad/s) and torque (N·m) with time for the training data for the control of a first link in the robotic arm in FIG. 14 or 15.
Figure 16B:
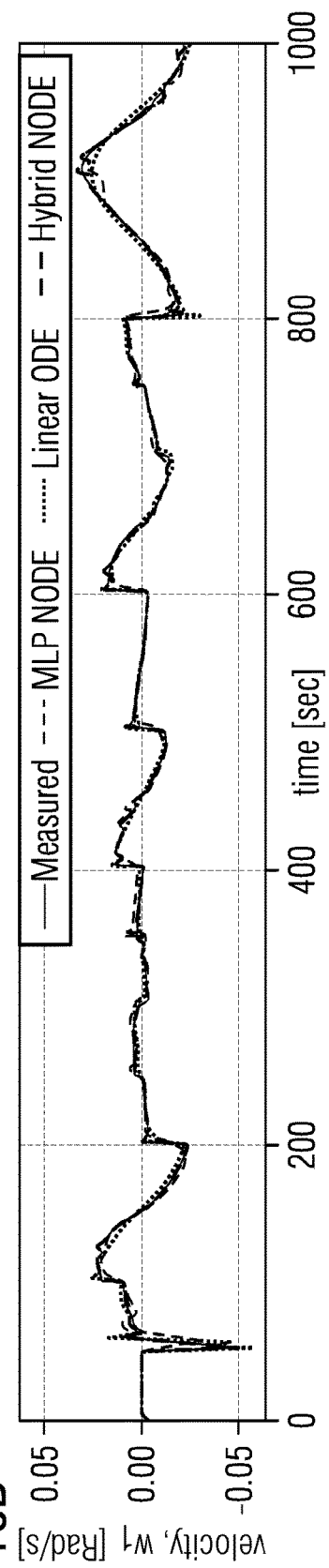
Figure 16C:
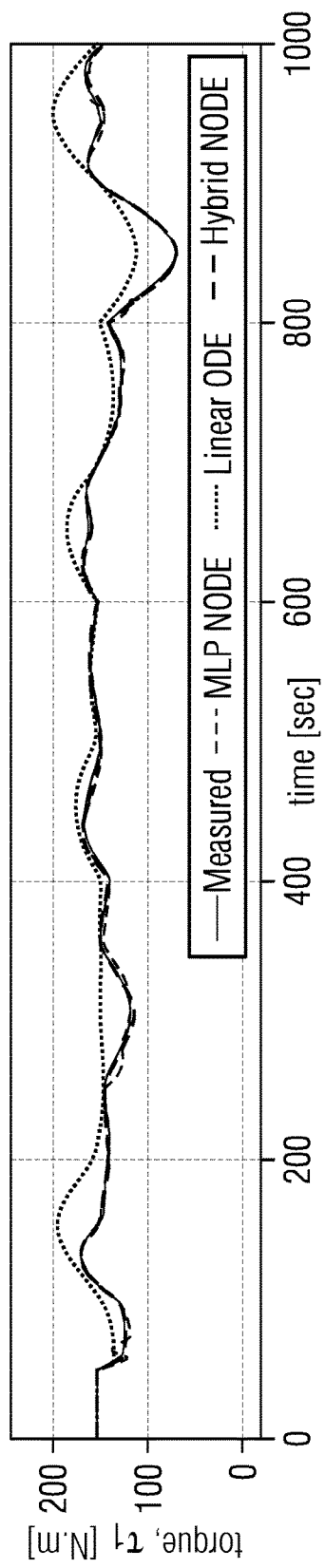
Figure 17A:
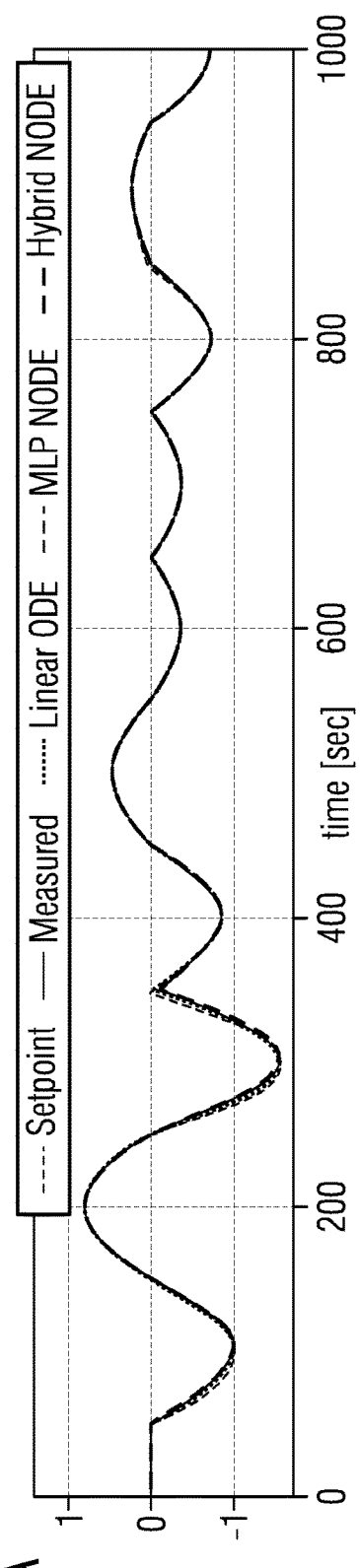
FIGS. 17a, 17b and 17c are graphs plotting the variation in angle (rad), velocity (Rad/s) and torque (N·m) with time for the training data for the control of a second link in the robotic arm in FIG. 14 or 15.
Figure 17B:
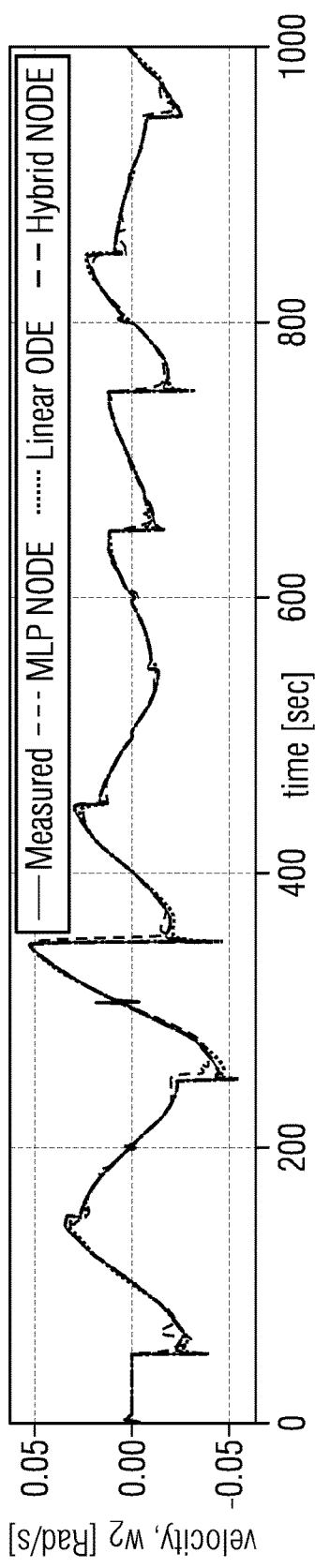
Figure 17C:
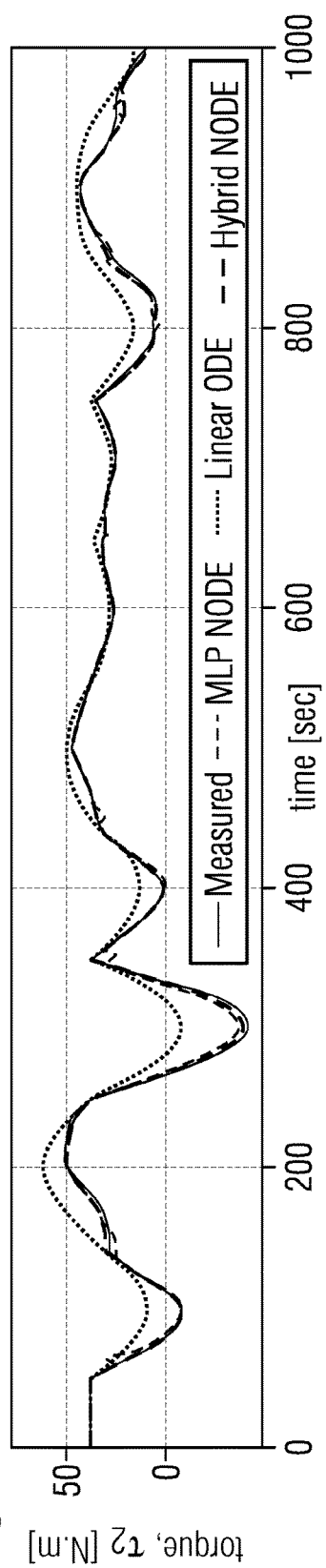

FIGS. 16a to 16c show respectively the variation in angle, velocity and torque with time for the first link for the first 1000 seconds of the 200,000 second training database. Similarly, FIGS. 17a to 17c show respectively the variation in angle, velocity and torque with time for the second link for the first 1000 seconds of the 200,000 second training database.

As in the previous example, the values predicted by the proposed Hybrid NODE model outlined above are compared with a purely linear ODE model which uses only the differential equations above (i.e., without the nonlinear blocks) and an MLP NODE model that only consists of a Multi-Layer Perceptron (MLP) network and does not integrate the Hammerstein-Wiener model. The variation in the setpoint and the measured values is also shown. As in the previous example, the mean-square error (MSE) between the measurements and the model output is minimised as a cost function to train the various models. At each training epoch, a batch of 1000 data points is used with a random starting point. The same cost function as that outlined above is used. As shown in FIGS. 16a to 17c, the hybrid and MLP node models give similar results for the training data but the linear ODE model is not able to accurately predict the torque variation over time.

Figure 19A:
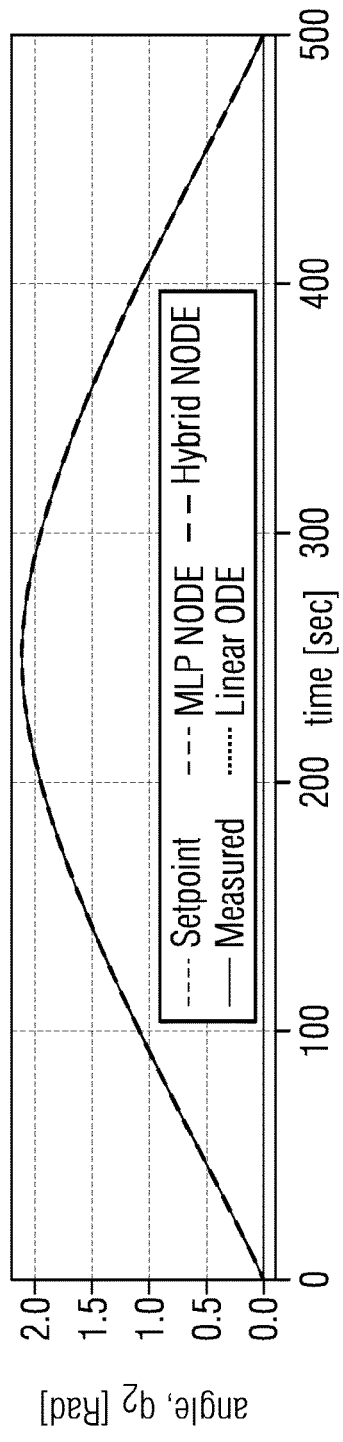
FIGS. 19a, 19b and 19c are graphs plotting the variation in angle (rad), velocity (Rad/s) and torque (N·m) with time for the validation data for the control of a second link in the robotic arm in FIG. 14 or 15.
Figure 19B:
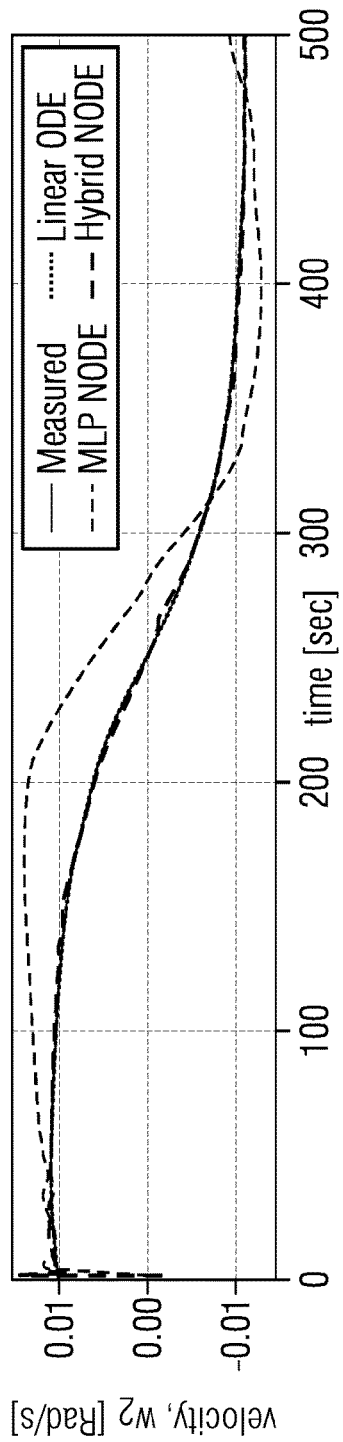
Figure 19C:
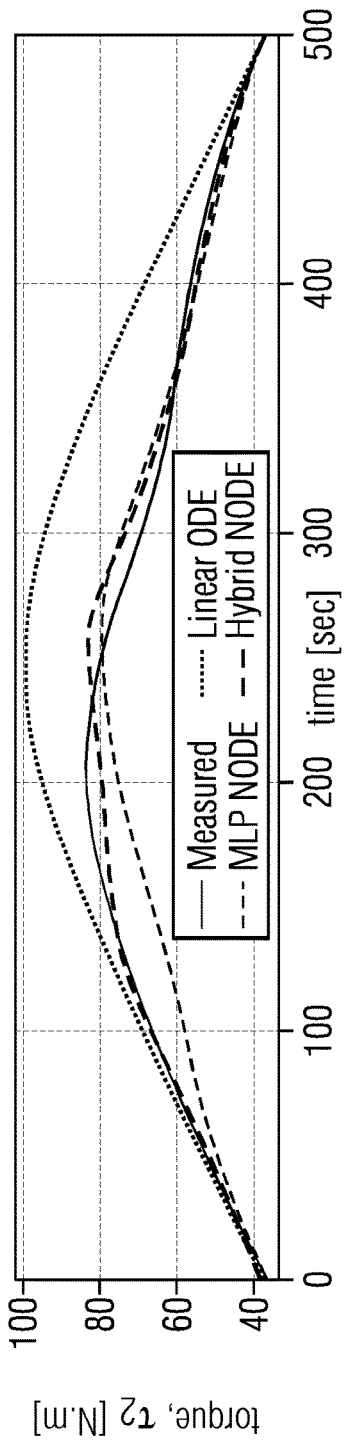

FIGS. 18a to 19c plot simulation results from the various models using a new dataset with setpoint values different from the training dataset to validate the models. In this example, the robotic arm is given a circular trajectory to follow. As with the results based on the training data, the simulation results in FIGS. 18a to 19c compare the simulation results of the three different models: linear ODE, MLP node and hybrid neural ODE model (labelled hybrid node) with the reference model in Matlab. FIGS. 18a to 18c show respectively the variation in angle, velocity and torque with time for the first link. Similarly, FIGS. 19a to 19c show respectively the variation in angle, velocity and torque with time for the second link.

The nonlinearity of the system means that the process gain varies by changing the operating point. The validation results shows that the hybrid neural ODE model, which includes both linear and non-linear blocks as described above, can predict the robot's torque and velocity more accurately than the two other models. By contrast, the linear model has poor performance for predicting the torque but gives perfect results for the predicting the velocity because it includes the first-principle relationship between the position and velocity (i.e. $\dot{q}_1 = w_1$). The measured outputs for the angle are regulated on the same given setpoints and are thus aligned for all the models. For a visual comparison, the graphs of torque and velocity thus show how well the newly proposed model fits the measurements from the reference model.

The mean square error for the training and validation exercises are shown below:

| Model | Training MSE | Validation MSE |
| --- | --- | --- |
| Hybrid NODE | 0.00080 | 0.00625 |
| MLP NODE | 0.00796 | 0.03089 |
| Linear ODE | 0.06758 | 0.28881 |

As is shown in the table above, the hybrid NODE models has a significantly lower MSE for both the training data and the validation data.

Figure 20:
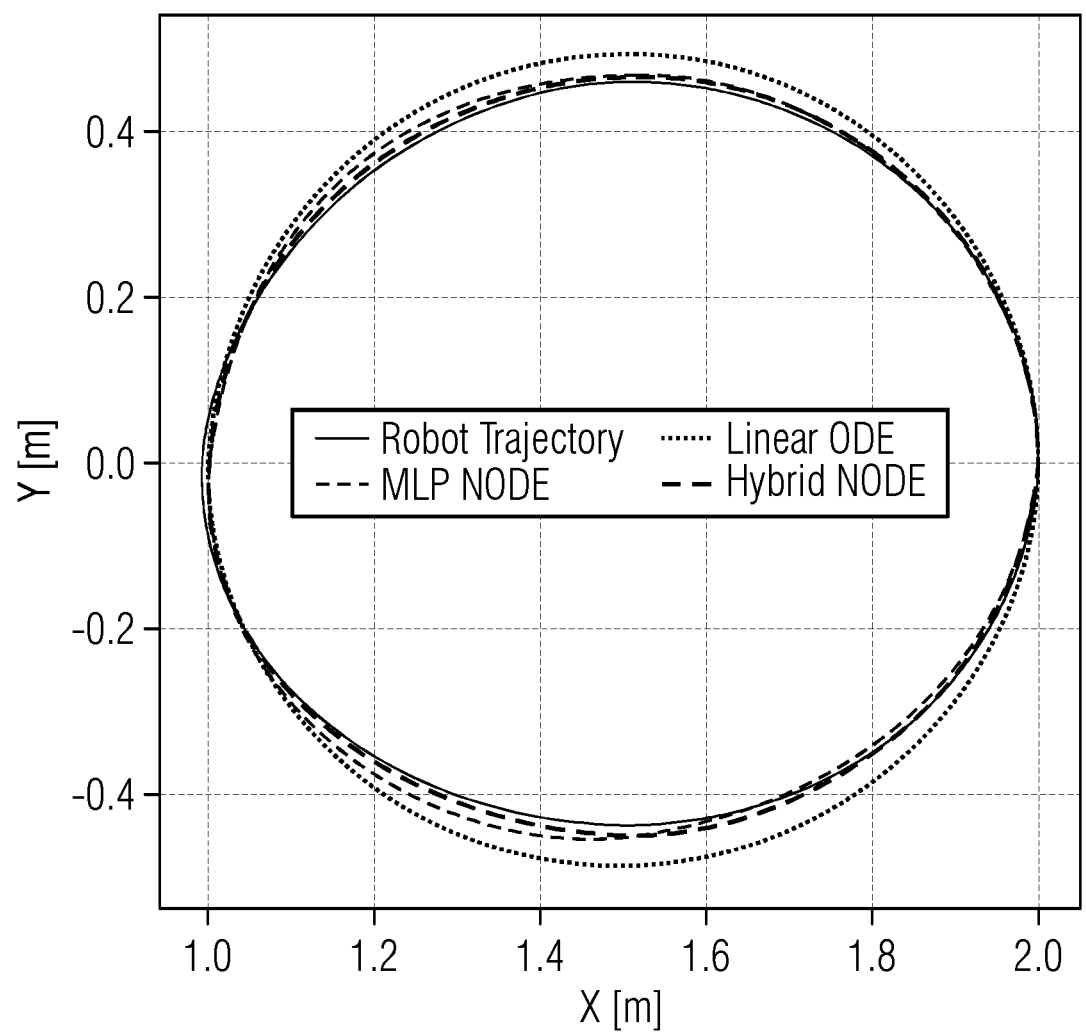
FIG. 20 shows the trajectories of the robotic arm of FIG. 14 as predicted by the various models.

FIG. 20 compares the trajectory prediction of the different models in the x-y coordinates. As it will be appreciated, controllers do not necessarily provide perfect control with zero errors and thus the real trajectory is not a perfect circle for any of the models or the measured trajectory. The hybrid NODE model proposed by this invention is the closest fit to the robot trajectory.

It should be appreciated that the engines and the program modules depicted in the Figures are merely illustrative and not exhaustive and that processing described as being supported by any particular engine or module may alternatively be distributed across multiple engines, modules, or the like, or performed by a different engine, module, or the like. In addition, various program module(s), script(s), plug-in(s), Application Programming Interface(s) (API(s)), or any other suitable computer-executable code hosted locally on the system and/or hosted on other computing device(s) accessible via one or more of the network(s), may be provided to support the provided functionality, and/or additional or alternate functionality. Further, functionality may be modularized differently such that processing described as being supported collectively by the collection of engines or the collection of program modules may be performed by a fewer or greater number of engines or program modules, or functionality described as being supported by any particular engine or module may be supported, at least in part, by another engine or program module. In addition, engines or program modules that support the functionality described herein may form part of one or more applications executable across any number of devices of the system in accordance with any suitable computing model such as, for example, a client-server model, a peer-to-peer model, and so forth. In addition, any of the functionality described as being supported by any of the engines or program modules may be implemented, at least partially, in hardware and/or firmware across any number of devices.

The operations described and depicted in the illustrative methods may be carried out or performed in any suitable order as desired in various example embodiments of the disclosure. Additionally, in certain example embodiments, at least a portion of the operations may be carried out in parallel.

Although specific embodiments of the disclosure have been described, one of ordinary skill in the art will recognize that numerous other modifications and alternative embodiments are within the scope of the disclosure. For example, any of the functionality and/or processing capabilities described with respect to a particular system, system component, device, or device component may be performed by any other system, device, or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

We also describe in an example, a computer-implemented method for modelling an industrial process, the method comprising: measuring, using at least one sensor, at least one input for the industrial process at an input time; and predicting at least one output of the industrial process at a subsequent time using the at least one measured input; wherein predicting the at least one output comprises using a hybrid neural network model to output a derivative of the at least one output at the input time, wherein the neural network model incorporates at least one neural network block and a first-principle block incorporating a dynamic model comprising at least one ordinary differential equation defining the rate of change over time of the at least one output as a function of the or each associated input; and inputting the derivative to an ordinary differential equation solver to predict at least one output at the subsequent time.

In the example method above, the dynamic model may be a linear model. The first principle block may receive an input from the at least one neural network block. The at least one neural network block may comprise an input neural block and an output neural block. The input neural block may implement a first memoryless nonlinear block parametrized by a first vector and the output neural block may implement a second memoryless nonlinear block parametrized by a second vector.

In the example method above, the industrial process may be a closed loop process comprising at least one controller and the neural network model further incorporates a control block. Measuring at least one input may comprise measuring at least one of a setpoint and a disturbance. The neural network model may be defined as:

$$w_t = f_H(u_t, d_t, \alpha)$$

$$z_t = f_w^{-1}(y_t, u_t, d_t, \beta)$$

$$\frac{dy_t}{dt} = g(z_t, w_t, \gamma)$$

$$\theta = [\alpha, \beta, \gamma]$$

where $u_t$ is the output from the controller, $y_t$ is the output and $d_t$ is the input disturbance, $f_H(.,\alpha)$ and $f_W^{-1}(.,\beta)$ are memoryless nonlinear blocks parametrized by the vectors $\alpha$ and $\beta$, respectively, $g(.,\gamma)$ is a dynamic model for the first principle block which is parametrized by the vector $\gamma$, and $\theta$ is the coefficient vector that parametrizes the model to fit the $U_N$ and $Y_N$ observations.

In the example method above, the method may comprise inputting the derivative to an ordinary differential equation solver having an adaptive time step. The dynamic model may be a first order dynamic model defined by at least one ordinary differential equation of the form:

$$\tau \frac{dz_t}{dt} = K_p w_t(t - \theta_p) - z_t$$

where $w_t$ is the input to the model, $z_t$ is the output from the model, $K_p$ is the steady-state gain, $\tau$ is the time constraint, and $\theta_p$ is the time delay.

In the example method above, the industrial process may be a gravity separation process for separating oil, water and gas and measuring the at least one output comprises measuring oil level, water level and gas pressure. In the example method above, the dynamic model may comprise six inputs including three disturbances and three setpoints for each of the inflow rates of oil, water and gas.

In the example method above, the industrial process may be controlling a robotic arm having two connected links and measuring the at least one output comprises measuring the angles of the two links.

We also describe in an example, a data processing system for modelling an industrial process, the system comprising at least one sensor for measuring at least one input for the industrial process; and a processor which is configured to receive a measurement of the at least one input from the at least one sensor at an input time; implement a hybrid neural network model to output a derivative of the at least one output at the input time based on the received measurement, wherein the hybrid neural network model incorporates at least one neural network block and a first-principle block incorporating a dynamic model comprising an ordinary differential equation defining the rate of change over time of the at least one output as a function of the or each associated input; input the derivative to an ordinary differential equation solver to predict the at least one output at a subsequent time; and output the prediction of at least one output at the subsequent time using the at least one measured input and output.

The invention claimed is:

1. A computer-implemented method for modelling an industrial process, wherein the industrial process is a closed loop process comprising a controller, the method comprising:
measuring, using at least one sensor, at least one input for the industrial process at an input time; and
predicting at least one output of the industrial process at a subsequent time using the at least one measured input;
wherein predicting the at least one output comprises
using a hybrid neural network model to output a derivative of the at least one output at the input time, wherein the hybrid neural network model incorporates at least one neural network model and a first-principle model incorporating a dynamic model comprising at least one ordinary differential equation defining the rate of change over time of the at least one output as a function of the or each associated input; and
inputting the derivative to an ordinary differential equation solver to predict at least one output at the subsequent time;
wherein the at least one neural network model comprises a first memoryless nonlinear block which is parametrized by a first vector and a second memoryless nonlinear block which is parametrized by a second vector;
wherein the first-principle model is parametrized by a third vector;
wherein a coefficient vector comprising the first, second and third vectors parametrizes the hybrid neural network model whereby the hybrid neural network model is fitted to training input and output observations from the industrial process,
wherein the hybrid neural network model further incorporates a control block for incorporating parameters of the controller into the hybrid neural network model; and
wherein using the hybrid neural network model comprises
receiving, at least one of the first and second memoryless nonlinear blocks, a controller output from the control block;
receiving, at the first memoryless nonlinear block, the at least one measured input;
producing, by the first memoryless nonlinear block, a first intermediate output;
receiving, at the second memoryless nonlinear block, an output of the industrial process at the input time;
producing, by the second memoryless nonlinear block, a second intermediate output;
receiving, at the first principle model, the first and second intermediate outputs; and
producing, by the first principle model, the derivative of the at least one output at the input time.

2. The method of claim 1, further comprising:
inputting, to the control block, an output of the industrial process at the input time;
outputting from the control block to at least one of the first memoryless nonlinear block and the second memoryless nonlinear block, a controller output.

3. The method of claim 1,
wherein measuring at least one input comprises measuring at least one of a setpoint and a disturbance.

4. The method of claim 3, further comprising:
inputting, to the control block, the at least one measured setpoint; and
inputting, to at least one of the first memoryless nonlinear block and the second memoryless nonlinear block, the at least one measured disturbance.

5. The method of claim 1,
wherein the hybrid neural network model is defined as:

$$u_t = c(y_t, r_t)$$
$$w_t = f_H(u_t, d_t, \alpha)$$
$$z_t = f_w^{-1}(y_t, u_t, d_t, \beta)$$
$$\frac{dy_t}{dt} = g(z_t, w_t, \gamma)$$
$$\theta = [\alpha, \beta, \gamma]$$

where $w_t$ is the first intermediate output, $z_t$ is the second intermediate output, $u_t$ is a controller output from the control block, $y_t$ is an output of the industrial process at the input time t, $d_t$ is the at least one measured input known as an input disturbance, $r_t$ is an input setpoint, $c(.)$ represents the control block with fixed known parameters, $f_H(.,\alpha)$ and $f_W^{-1}(.,\beta)$ are the first and second memoryless nonlinear blocks parametrized by the first and second vectors $\alpha$ and $\beta$, respectively, $g(.,\gamma)$ is the dynamic model for the first principle model which is parametrized by the third vector $\gamma$, and $\theta$ is the coefficient vector that parametrizes the hybrid neural network model to fit a set of training observations.

6. The method of claim 1,
wherein the first memoryless nonlinear block is the first nonlinear block from the Hammerstein-Wiener model structure and the second memoryless nonlinear block is the inverse of the second nonlinear block from the Hammerstein-Wiener model structure.

7. The method of claim 1,
wherein the output of the industrial process which is input to the second memoryless nonlinear block is selected from a measured output and a predicted output.

8. The method of claim 1, further comprising
repeating the measuring and predicting steps for multiple iterations,
wherein in an initial iteration, the measuring step comprises measuring an initial value of the at least one output at the input time and the predicting step comprises using the at least one measured input and the measured initial value of the at least one output to predict the at least one output of the industrial process at a subsequent time; and
in subsequent iterations, the predicting step uses the at least one measured input and the predicted value of the at least one output which was predicted in a previous iteration.

9. The method of claim 1, further comprising
inputting the derivative to an ordinary differential equation solver having an adaptive time step.

10. The method of claim 1, wherein the dynamic model is a linear model which is selected from a first order dynamic model and a second order dynamic model.

11. The method of claim 1, wherein the industrial process is a gravity separation process for separating oil, water and gas and measuring the at least one output comprises measuring oil level, water level and gas pressure.

12. The method of claim 11, wherein the dynamic model comprises six inputs including three disturbances and three setpoints; one for each of the inflow rates of oil, water and gas.

13. The method of claim 1, wherein the industrial process is controlling a robotic arm having two connected links and measuring the at least one output comprises measuring the angles of the two links.

14. A non-transitory computer readable medium comprising:
processor control code stored thereon which when implemented in a system causes the system to carry out the method of claim 1.

15. A data processing system for modelling an industrial process, wherein the industrial process is a closed loop process, the system comprising:
at least one sensor for measuring at least one input for the industrial process;
a controller; and
a processor which is configured to
receive a measurement of the at least one input from the at least one sensor at an input time;
implement a hybrid neural network model to output a derivative of the at least one output at the input time based on the received measurement, wherein the hybrid neural network model incorporates at least one neural network model and a first-principle model incorporating a dynamic model comprising an ordinary differential equation defining the rate of change over time of the at least one output as a function of the or each associated input;
input the derivative to an ordinary differential equation solver to predict the at least one output at a subsequent time; and
output the prediction of at least one output at the subsequent time using the at least one measured input;
wherein the at least one neural network model comprises a first memoryless nonlinear block which is parametrized by a first vector and a second memoryless nonlinear block which is parametrized by a second vector;
wherein the first-principle model is parametrized by a third vector;
wherein a coefficient vector comprising the first, second and third vectors parametrizes the hybrid neural network model whereby the hybrid neural network model is fitted to training input and output observations from the industrial process,
wherein the hybrid network model further incorporates a control block for incorporating parameters of the controller into the hybrid neural network model; and
wherein using the hybrid neural network model comprises
receiving, at least one of the first and second memoryless nonlinear blocks, a controller output from the control block;
receiving, at the first memoryless nonlinear block, the at least one measured input;
producing, by the first memoryless nonlinear block, a first intermediate output;
receiving, at the second memoryless nonlinear block, an output of the industrial process at the input time;
producing, by the second memoryless nonlinear block, a second intermediate output
receiving, at the first principle model, the first and second intermediate outputs; and
producing, by the first principle model, the derivative of the at least one output at the input time.

* * * * *